(12) United States Patent
Battle

(10) Patent No.: US 12,539,950 B2
(45) Date of Patent: Feb. 3, 2026

(54) DEVICE AND METHOD FOR DISABLING AN UNDERSEA MINE, AN UNDERWATER TRANSPORT AND METHODS THEREFOR

(71) Applicant: MISSION SYSTEMS HOLDINGS PTY LTD., Sydney (AU)

(72) Inventor: David Battle, Sydney (AU)

(73) Assignee: MISSIONS SYSTEMS HOLDINGS PTY LTD., Sydney (AU)

( * ) Notice: Subject to any disclaimer, the term of this patent is extended or adjusted under 35 U.S.C. 154(b) by 95 days.

(21) Appl. No.: 18/251,891

(22) PCT Filed: Nov. 5, 2021

(86) PCT No.: PCT/AU2021/051314
§ 371 (c)(1),
(2) Date: May 5, 2023

(87) PCT Pub. No.: WO2022/094672
PCT Pub. Date: May 12, 2022

(65) Prior Publication Data
US 2024/0010312 A1    Jan. 11, 2024

(30) Foreign Application Priority Data
Nov. 5, 2020    (AU) .................... 2020904026

(51) Int. Cl.
*B63G 7/08* (2006.01)
*B63G 7/00* (2006.01)
*B63G 8/00* (2006.01)

(52) U.S. Cl.
CPC .............. *B63G 7/08* (2013.01); *B63G 8/001* (2013.01); *B63G 2007/005* (2013.01); *B63G 2008/004* (2013.01)

(58) Field of Classification Search
CPC .... B63G 7/08; B63G 8/001; B63G 2007/005; B63G 2008/004; B63G 7/02; G01S 15/02;
(Continued)

(56) References Cited

U.S. PATENT DOCUMENTS 5,050,523 A * 9/1991 Schwemin ................ F41F 3/10
114/259
6,647,854 B1 11/2003 Stottlemyer et al.
(Continued)

FOREIGN PATENT DOCUMENTS

DE             289417 A7    5/1991
DE      102019201764 A1    1/2020
(Continued)

OTHER PUBLICATIONS

International Search Report and Written Opinion issued on Jan. 14, 2022, in corresponding International Application No. PCT/AU2021/051314, 21 pages.
(Continued)

*Primary Examiner* — Anthony D Wiest
(74) *Attorney, Agent, or Firm* — Maier & Maier, PLLC

(57) ABSTRACT

A mine countermeasure device for disabling an undersea mine, and underwater transport, and methods therefor. The mine countermeasure device operates to mask, cancel or neutralise (detonate) the undersea mine. The mine countermeasure device is deployed, together with a plurality of other mine countermeasure devices from an underwater transport, for example autonomously. The underwater transport preferably carries out a scan of an area known to be mined, in order to identify undersea mines. The underwater transport is capable of autonomous operation over the horizon to deliver plurality of mine countermeasure devices. The mine countermeasure device targets particular sensors on the undersea mines.

9 Claims, 28 Drawing Sheets

(58) Field of Classification Search
CPC .......... G01S 17/66; G01S 15/04; G01S 17/88; G01V 1/001; G01V 3/12; G01V 3/15
See application file for complete search history.

(56) References Cited

U.S. PATENT DOCUMENTS

| | | |
|---|---|---|
| 6,738,314 B1 | 5/2004 | Teeter et al. |
| 6,907,326 B1 | 6/2005 | Kucik |
| 2013/0263725 A1 | 10/2013 | Isserstedt |
| 2016/0244135 A1 | 8/2016 | Farber et al. |

FOREIGN PATENT DOCUMENTS

| | | | |
|---|---|---|---|
| EP | 0247367 A1 | 12/1987 | |
| EP | 0308698 A1 | 3/1989 | |
| EP | 0675038 A1 | 10/1995 | |
| KR | 102579652 B1 * | 9/2023 | ................ F41F 3/10 |
| RU | 2662573 C2 | 7/2018 | |
| WO | 0102247 A1 | 1/2001 | |
| WO | 2019116307 A1 | 6/2019 | |

OTHER PUBLICATIONS

International Preliminary Report on Patentability issued on Sep. 15, 2022, in corresponding International Application No. PCT/AU2021/051314, 10 pages.

\* cited by examiner

DEVICE AND METHOD FOR DISABLING AN UNDERSEA MINE, AN UNDERWATER TRANSPORT AND METHODS THEREFOR

FIELD

The present invention relates a device and method for neutralising and/or jamming an underwater explosive device and in particular an undersea multi-influence bottom mine.

The invention has been developed primarily for use with undersea multi-influence bottom mines and will be described hereinafter with reference to this application. However, it will be appreciated that the invention is not limited to this particular field of use.

BACKGROUND

Presently, undersea mines are neutralised using a number of methods including the use of "one-shots" or "kill vehicles" which are essentially single use Autonomous Underwater Vehicles (AUVs) incorporating shaped explosive charges which are used to detonate the mine via "sympathetic detonation". Such AUVs are expensive as they are single use and are of considerable size, weight and complexity. Additionally, they include an explosive charge that requires explosive certification among other things, and can present a safety hazard during transport and storage. Furthermore, the consequences of falsely identifying a mine (or mine like object) when explosive devices are used can be serious Another method presently in use, involves "sweeping" with large permanent magnets in the form of dyads to mimic the magnetic field generated by a ship. These dyads may be towed behind a ship in order to simulate a vessel and hence trigger the detonation of a mine. As mines are becoming more intelligent with the ability to detect a dyad or similar mine sweeping device, these methods are becoming less effective. Furthermore, dyads are typically around 7 meters long and can weigh around 1.6 tons, making them difficult to transport and expensive to produce.

In conjunction with dyads, acoustic noise generators are often towed through suspected mine fields to replicate both the acoustic and magnetic signatures of ships, thus adding to the realism with which targets are emulated and increasing the probability of mine neutralisation through actuation.

Any discussion of the background art throughout the specification should in no way be considered as an admission that such background art is prior art, nor that such background art is widely known or forms part of the common general knowledge in the field in Australia or any other country.

SUMMARY

The invention seeks to provide a method and device which will overcome or substantially ameliorate at least some of the deficiencies of the prior art, or to at least provide an alternative.

The present invention relates to a mine countermeasure device in the form of a non-explosive device (which may be referred to as a Micro Influence Generator (MIG)) and method adapted for use in close proximity to an undersea mine for both neutralising and jamming undersea mines. This is achieved by either generating signals which emulate a target ship that the mine is adapted to activate on or through the generation of cancelling or confusing signals in the case of mine jamming.

The present invention also relates to an autonomous underwater vehicle (AUV), the autonomous underwater transport for deploying mine countermeasure devices including:
  a. a prime mover;
  b. a hull including an internal cargo bay for holding at least one or more mine neutralising devices within the cargo bay; and; and
  c. a device deployment system including an ejection mechanism configured for autonomously ejecting the at least one or more mine countermeasure devices from the cargo bay,
wherein the at least one or more mine countermeasure devices are ejected by the ejection mechanism with a rearward velocity component from the cargo bay in use.

In one embodiment, the mine countermeasure device is tilted prior to being ejected such that the mine countermeasure device is ejected at an obtuse angle with respect to a direction of travel of the underwater transport.

In one embodiment, the underwater transport incudes a navigation system.

In one embodiment, the underwater transport includes a controller configured for:
  a. receiving a signal indicative of a location of an identified undersea mine;
  b. autonomously controlling movement of the transport to approach an identified undersea mine; and
  c. deploying at least one or more mine countermeasure devices in the close proximity of the at least one or more undersea mines In one embodiment, the underwater transport includes at least one or more sensors configured for identifying undersea mines.

In one embodiment, the signal indicative of the location of an identified undersea mine is received from the one or more sensors.

In one embodiment, the controller is configured for receiving a signal identifying at least one or more sensors on the at least one or more undersea mines with respect to the at least one or more mine countermeasure devices.

In one embodiment, the controller is configured for detecting a range and bearing of at least one or more sensors on the at least one or more undersea mines with respect to the deployed mine countermeasure devices.

In one embodiment, the controller is configured for transmitting a range and bearing of the at least one or more detected sensors on the at least one or more undersea mines to at least one or more deployed mine countermeasure devices.

In another aspect of the present invention, an autonomous underwater transport for deploying mine countermeasure devices is disclosed, the autonomous underwater transport including:
  a. a prime mover;
  b. a hull including an internal cargo bay for holding at least one or more mine countermeasure devices within the cargo bay; and
  c. a device deployment system including an ejection mechanism configured for autonomously ejecting the at least one or more mine countermeasure devices from the cargo bay,
wherein the device deployment system comprises a rotating mechanism configured for rotating the one or more mine countermeasure devices prior to being ejected by the ejection mechanism.

In one embodiment, the mine countermeasure device is rotated about 90 degrees such that the major faces of the countermeasure device are aligned with the direction of travel.

In one embodiment, the underwater transport incudes a navigation system.

In one embodiment, the underwater transport includes a controller configured for:
  a. receiving a signal indicative of a location of an identified undersea mine;
  b. autonomously controlling movement of the transport to approach an identified undersea mine;
  c. rotating the mine countermeasure device; and
  d. deploying at least one or more mine countermeasure devices in the close proximity of the at least one or more undersea mines.

In one embodiment, the underwater transport includes at least one or more sensors configured for identifying undersea mines.

In one embodiment, the signal indicative of the location of an identified undersea mine is received from the one or more sensors.

In one embodiment, the controller is configured for receiving a signal identifying at least one or more sensors on the at least one or more undersea mines with respect to the at least one or more mine countermeasure devices.

In one embodiment, the controller is configured for detecting a range and bearing of at least one or more sensors on the at least one or more undersea mines with respect to the deployed mine countermeasure devices.

In one embodiment, the controller is configured for transmitting a range and bearing of the at least one or more detected sensors on the at least one or more undersea mines to at least one or more deployed mine countermeasure devices.

Other aspects of the invention are also disclosed.

BRIEF DESCRIPTION OF THE DRAWINGS

Notwithstanding any other forms which may fall within the scope of the present invention, preferred embodiments of the invention will now be described, by way of example only, with reference to the accompanying drawings in which.

DETAILED DESCRIPTION OF EMBODIMENTS

Figure 1:
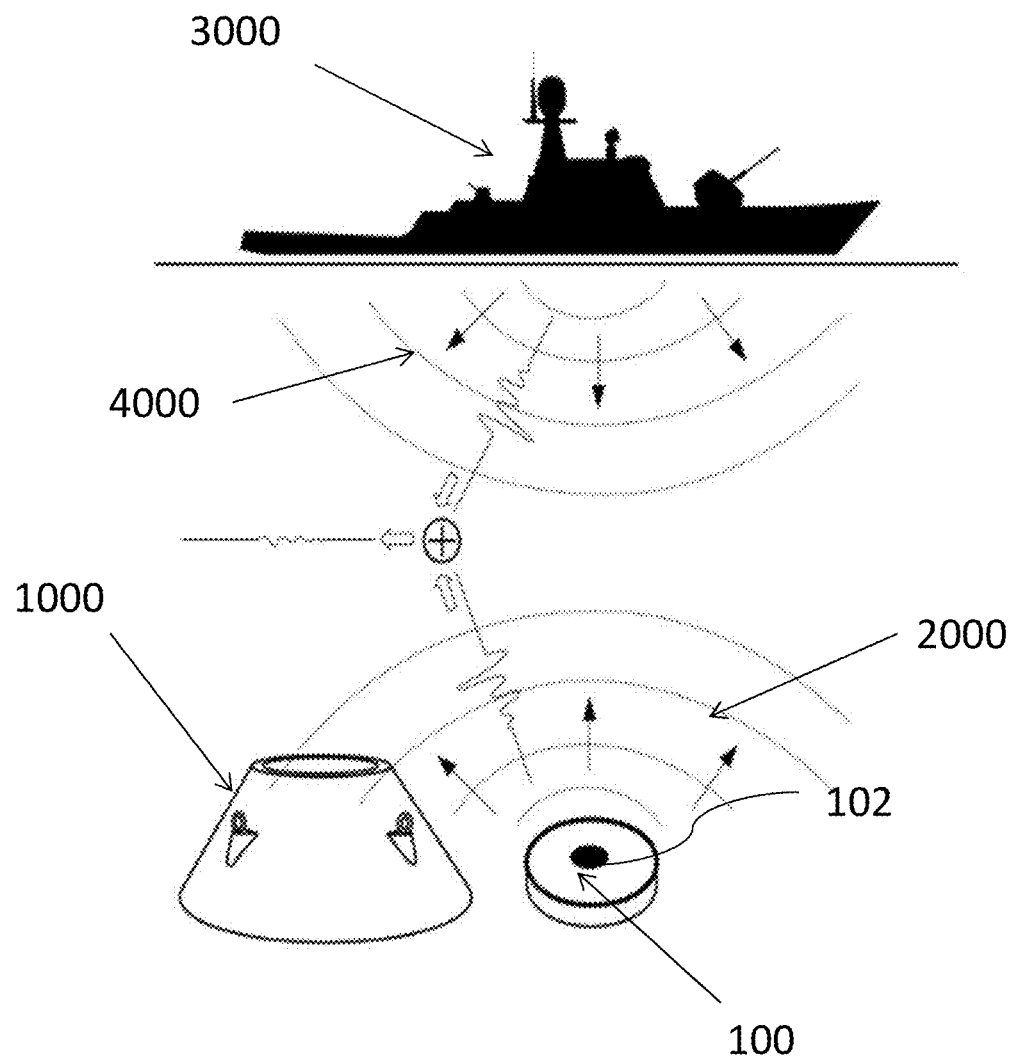
FIG. 1 shows a schematic elevation view of a mine jamming/neutralising device in use in accordance with an embodiment of the present invention.

It should be noted in the following description that like or the same reference numerals in different embodiments denote the same or similar features.

In this specification the mine countermeasure device, mine neutralising device and mine jamming device will be given the same designation 100 and used interchangeably for the purposes of the figures. The term Micro Influence Generator (MIG) will also be used to describe these devices generally.

Mine Neutralisation

The concept of mine neutralisation embodied in this invention involves the generation of synthetic signals that mimic underwater signals indicative of a target vessel in close proximity to an underwater mine, resulting in the self-destruction and hence neutralisation of the underwater mine through actuation or detonation.

Underwater mines or more specifically multi-influence underwater mines, may typically have a plurality of sensors which are used to detect the presence of target vessels resulting in the detonation of the mine when a target vessel is detected. Such sensors may sense a wide variety of parameters as an indication of the presence of their target. The parameters can include sound, pressure, magnetic fields, or the like. The invention functions to neutralise the mine to set it off and cause it to explode by triggering one or more of these sensors in close proximity to the mine.

With reference to the figures, undersea mines 1000 are adapted to trigger or detonate based on the detection of signals which are typically generated by vessels such as ships 3000. One aspect of the present invention is related to devices for neutralising undersea mines, wherein the devices are adapted for use in close proximity to the undersea mine 1000, and preferably within 2 to 3 m. This allows for the generation of signals 2000 at relatively low power levels in comparison to methods of generating signals performed at sea level, where it is necessary to generate high power signals due to the loss in power of the signal that is proportional to the distance that the signal has travelled.

By using devices and methods that generate signals 2000 in close proximity to the undersea mine 1000, this means that a lower power is required to generate the signals 2000, a smaller device can be used, and a larger number of devices 100 can be produced economically, and more of such devices 100 can be transported together, for example on a surface ship and/or autonomous underwater vehicle (AUV) as they take up less space. Further, because lower power is required, smaller power sources such as batteries can be used, which can be expected to last longer.

Mine Jamming

The concept of mine jamming embodied in invention involves the masking of parameters that sensors of the underwater mine are sensing, so that the underwater mine is prevented from detonating. Mine jamming does not involve the detonation or self-destruction of the underwater mine, and instead the underwater mine remains a threat that can be controlled, possibly to the disadvantage of the parties that set the underwater mine in the first place.

Similar conveniences are provided as described above with reference to mine neutralisation by using devices and methods that generate signals in close proximity to the undersea mine 1000, in that a smaller device can be used, requiring lower power, thereby providing benefits in transportation and/or storage.

Mine Neutralising Device

Figure 5:
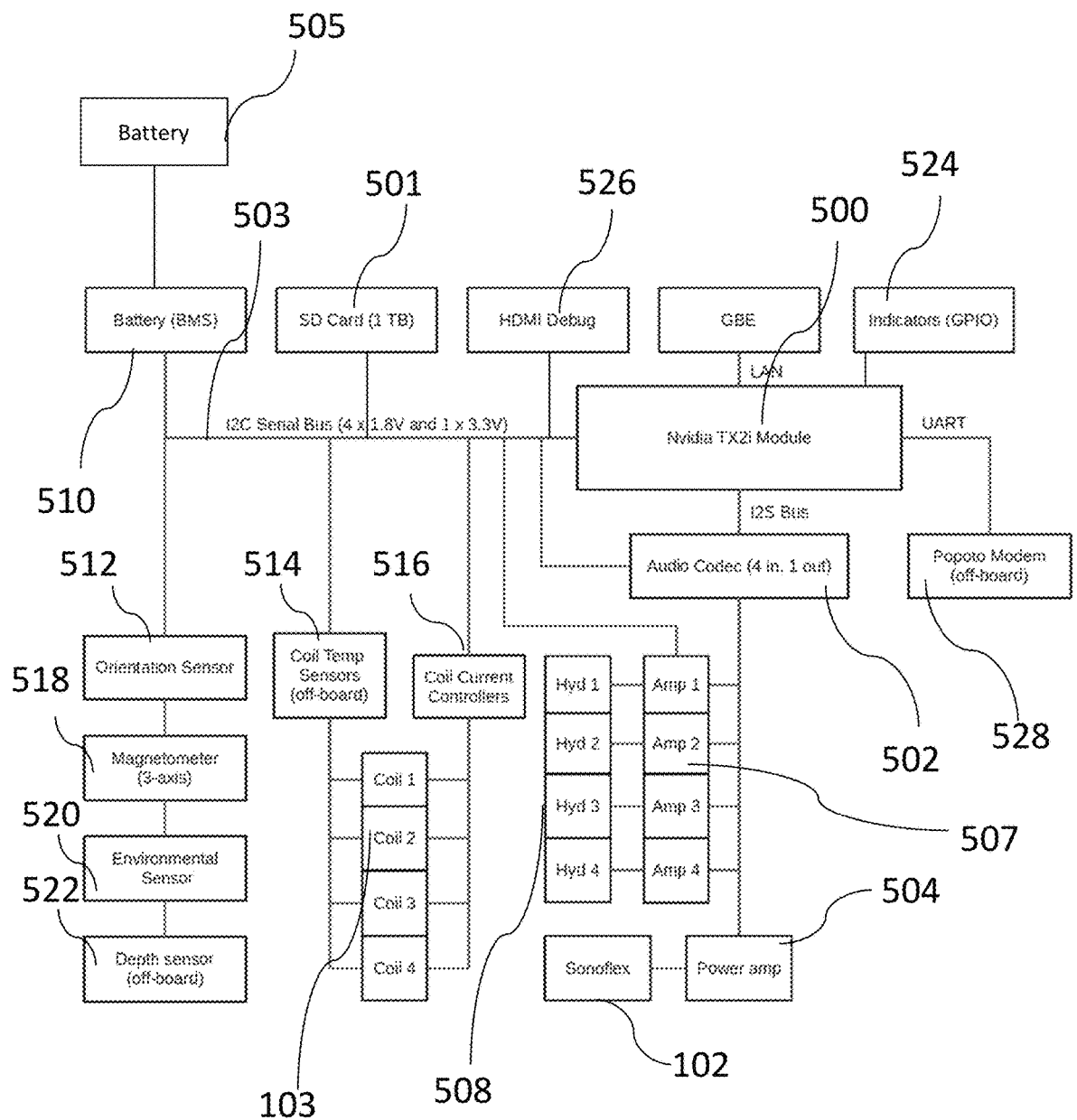
FIG. 5 shows a schematic view of a module layout of a mine jamming/neutralising device.
Figure 6:
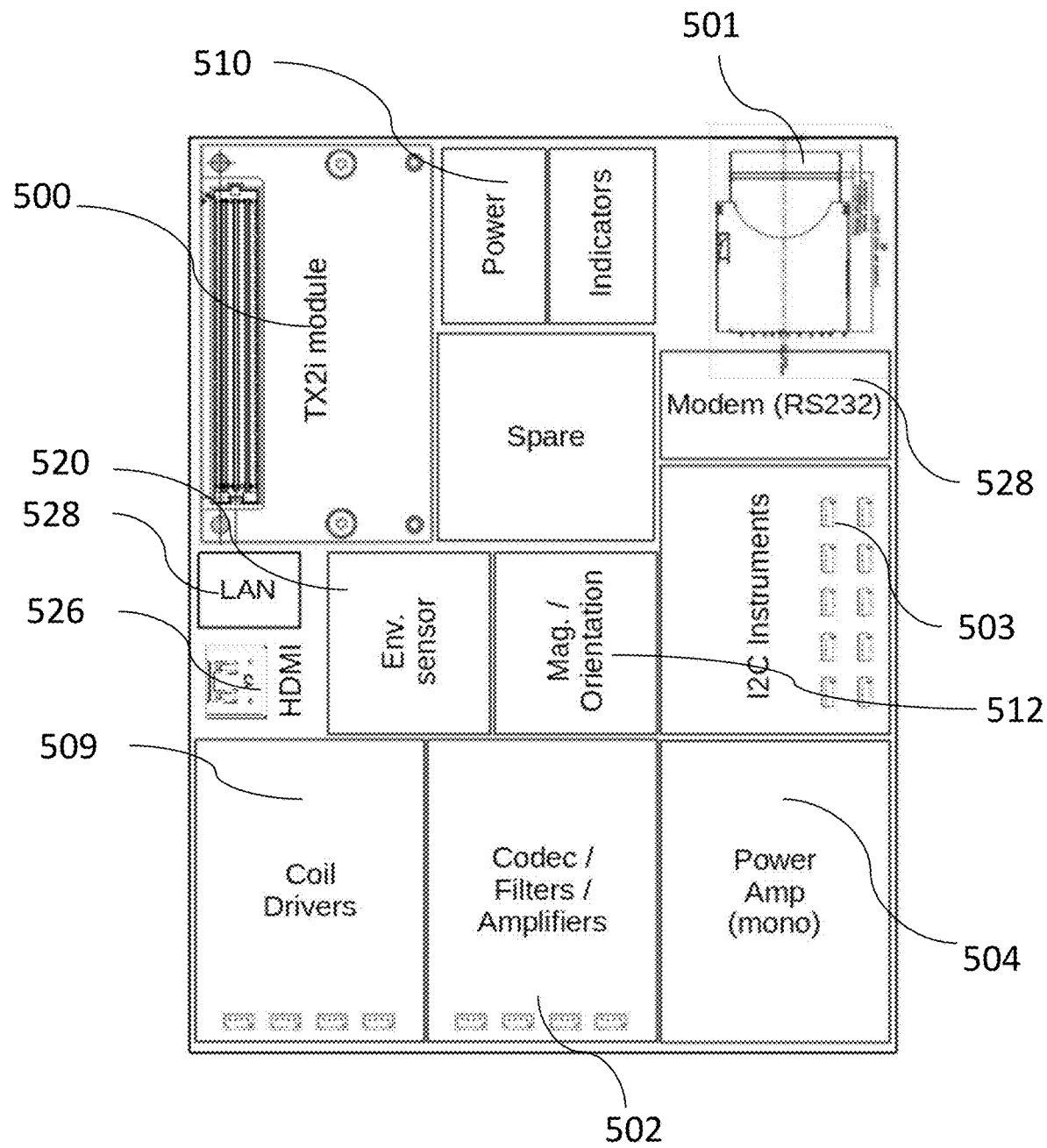
FIG. 6 shows a circuit board layout schematic of the component layout of the mine jamming/neutralising device.

In one embodiment, the Micro influence generator 100 can be configured as a mine neutralising device 100. When used as a mine neutralising device, signals emulating a vessel 3000 are generated within the vicinity of the mine 1000 in order to actuate the mine 1000 to detonate. With reference to FIGS. 5 and 6, the mine neutralising device 100 includes a controller including a processor 500 such as the Nvidia TX2i and incorporating a memory 501, preferably in the form of an SD card, that is adapted to store data and digital instructions. In the embodiment shown, the processor 500 communicates with devices using an I2C serial bus 503. There are a number of inputs which are operably connected to the processor including a Battery Management System (BMS) 510, orientation sensors 512, coil temperature sensors 514 and coil current controllers 516. Other sensors include a 3 axis magnetometer 518, environmental sensors 520 such as temperature sensors and pressure sensors, and a depth sensor 522. Further, the mine neutralising device 100 can include a general-purpose input/output (GPIO) 524, as well as connectors 526 the such as HDMI connectors for connecting to external electronic devices, for example for the purpose of maintenance, upgrade, debugging, or the like.

For instance, to generate acoustic energy, the processor 500 is connected to an audio Codec 502 via the I2S serial bus 503. The output of the audio Codec 502 is then fed into the input of a power amplifier 504. The output of the power amplifier 504 is then fed into a low frequency acoustic transponder in the form of flexural disc transducer 102 to generate acoustic energy in a manner as will be described below. In the embodiment shown a SonoFlex 850 HP flexural disc transducer 102 from Chelsea Technologies is used.

In order to activate the undersea mine 1000, the mine neutralising device 100 may include software instructions stored on the memory 501 for directing the processor to generate preferably time-dependent acoustic signals 2000 emulating a vessel 3000. The generation of signals 2000 emulating a vessel may be by retrieving and playing a recorded acoustic signature stored in memory 501, or generating the signals 2000 using a suitable algorithm to synthesise the sounds of a vessel. Another means of generating an acoustic signature which is indistinguishable from a vessel, is to use parametrically described acoustic signatures which may be stored in memory 501 and used to generate an infinite range of signatures for a variety of different vessels.

Figure 7:
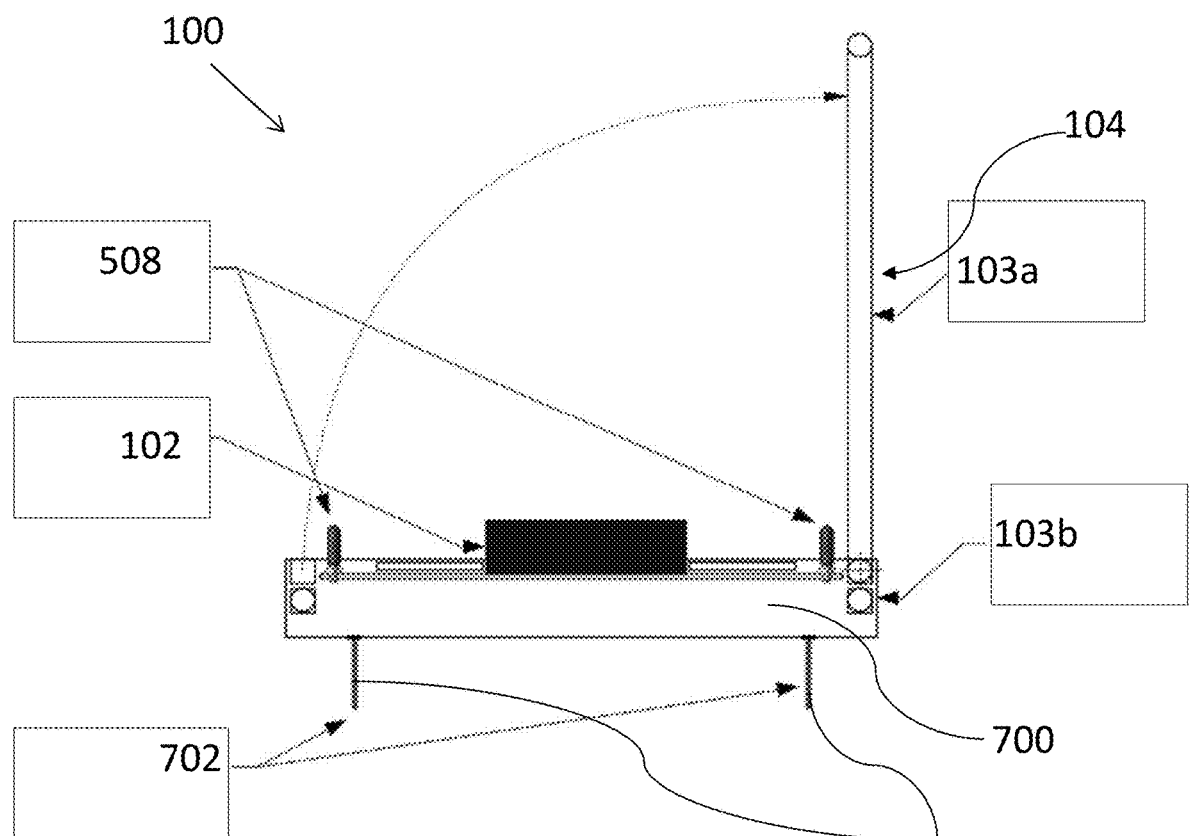
FIG. 7 shows a side elevation view of a mine jamming/neutralising device.

As shown in FIGS. 5 and 7, the mine neutralising device 100 can further include a coil arrangement 104. The coil arrangement 104 includes preferably a plurality of coils 103, including vertical coil 103a, a horizontal coil 103b, and a coil driver in the form of coil current controllers 516. Preferably each of the coils defines a plane.

There are a number of inputs which are operably connected to the processor including a Battery Management System (BMS) 510 and battery 505, orientation sensors 512, coil temperature sensors 514 and coil current controllers 516. Battery 505 may be replaceable.

In order to generate signals emulating the magnetic signature of the vessel 3000, coils 103 are driven using coil current controllers 516 in order to generate magnetic fields in the vicinity of the undersea mine 1000. The coils 103 are wound around a former (not shown) with one embodiment comprising of 400 turns of AWG 18 enameled copper wire. More preferably, the coils 103 are composed of aluminium foil formed on a former and coated with epoxy for lightness.

Experiments show that magnetic flux densities on the order of 1 µT (0.01 Gauss) at 2 metres from the undersea mine 1000 are achievable. Such flux densities are sufficient to trigger an undersea mine 1000. In another embodiment, any other suitable number of turns may be utilised in the coils 103.

In addition to generating magnetic fields, mine neutralising device 100 can include one or more electrodes (not shown) configured for conducting current through the water near the mine. Such electrodes may be movable to extend from the mine neutralising device, or could extend permanently at a distance from the mine neutralising device 100.

Further, the mine neutralising device 100 can include a seismic transducer to generate seismic signals in the vicinity of the undersea mine 1000 to simulate the seismic signals that are generated by a vessel 3000. The seismic generator is preferably in the form of a vibrating device (not shown).

The vibrating device preferably includes a rotating shaft on which an unbalanced weight is located. The shaft may be rotated at speed to generate a seismic signal. Such vibration devices are known by persons skilled in the art, and are commonly used, for example in mobile phones to notify the user of a call or other message.

The frequency and amplitude of the vibration device may be tuned to the particular frequency and amplitude which the mine sensors are configured to detect. The frequency can be tuned by changing the speed of rotation of the shaft, while the amplitude can be tuned by changing their weight and/or geometry of the unbalanced weight relative to the shaft.

Mine Jamming Device

The micro influence generator 100 can also be used as a mine jamming device. The micro influence generator 100 when used as a mine jamming device 100 can include identical features to that of the mine neutralising device described above.

Referring to FIG. 1, the mine jamming device 100 is intended to prevent the mine 100 from detonating by suppressing signals representative of a vessel 3000 within the vicinity of the mine 100.

As many undersea mines 1000 tend to "wake up" or actuate from a sleep mode based on an acoustic channel, one method of mine jamming involves the suppression of acoustic waves within the vicinity of the mine 100 to produce a "zone of relative quiet" around the mine 100.

FIG. 1 exemplifies an apparatus used for an adaptive cancellation technique used in the mine jamming device 100, as will be discussed in more detail below. In one embodiment, the adaptive cancellation technique utilises one or more hydrophones in a hydrophone array 508 to monitor acoustic waves within the vicinity of the mine and performs adaptive cancellation on those waves by rebroadcasting an anti-phase signal in the direction of the undersea mine 1000, which when overlaid on the acoustic waves arriving at the undersea mine 1000 from a vessel (or any other source), attenuates the amplitude of the acoustic wave in the vicinity of the mine 1000. Noise cancellation is a well-known form of signal modification, and a description of the methodologies used is considered beyond the scope of this specification.

Figure 9:
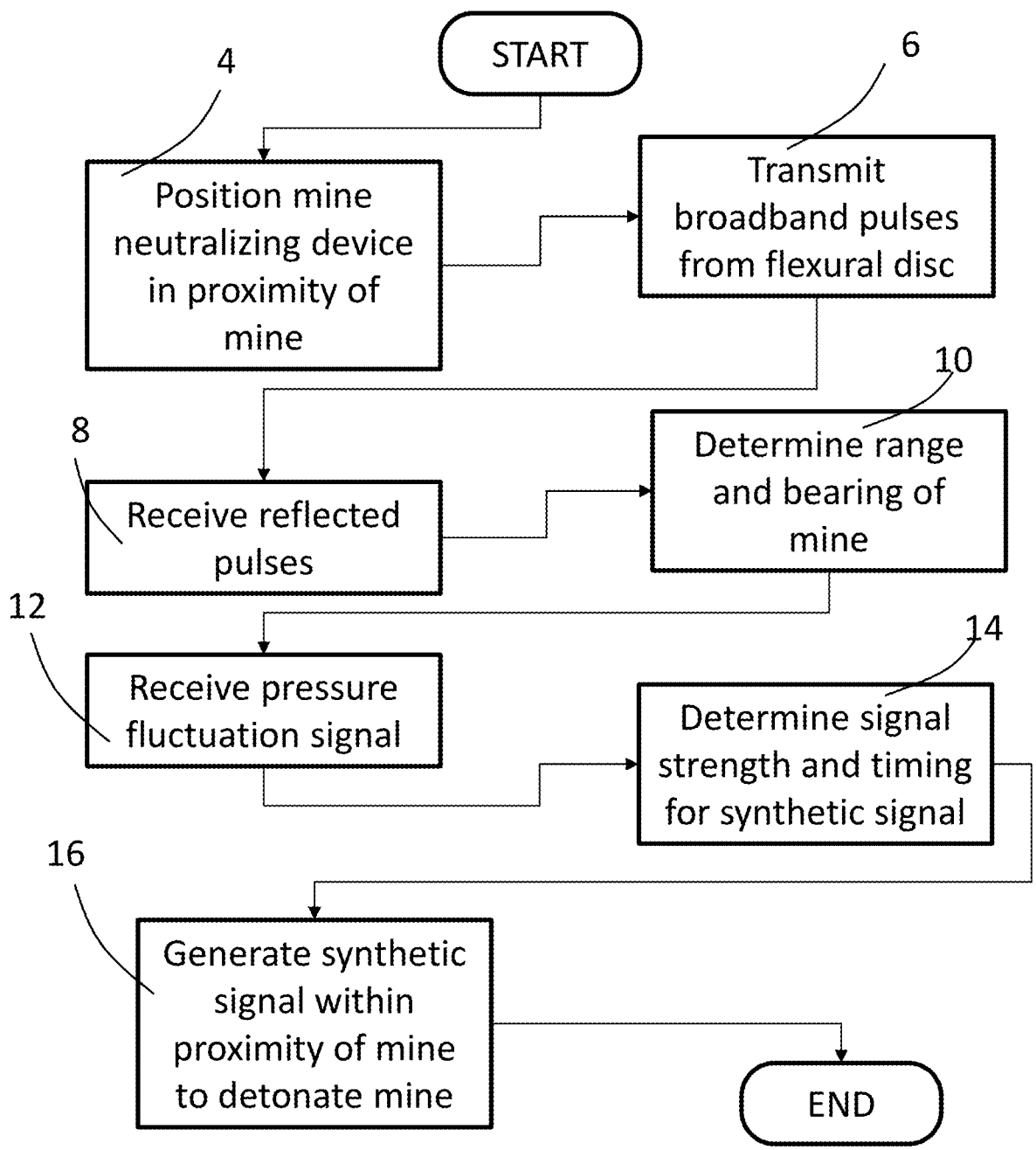
FIG. 9 shows a flowchart exemplifying a method of disabling an undersea mine.

Referring to FIGS. 5 and 9, the audio Codec 502 in the embodiment shown, includes 4 inputs and 1 output. The 4 inputs are connected to a hydrophone 508 in the form of a hydrophone array 508 for detecting acoustic energy for processing by the processor 500. The output of the audio Codec 502 is fed into a power amplifier 504 which provides sufficient energy to drive the flexural disc transducer 102. In normal operation, the acoustic signals detected by the hydrophone 508 is fed into the processor 500 after amplification via amplifiers 507 for signal processing. After the acoustic signals are processed, software instructions direct the processor to generate a cancelling signal, which is then fed into the power amplifier 504 to in turn drive the flexural disc transducer 102 to generate a cancelling acoustic signal.

It is anticipated that, and determining the correct noise cancellation signal, the processor may take into account the positioning, and in particular distance, of the mine jamming device 100 from the undersea mine 1000. For example, the noise cancellation signal may be generated with a view to it being reduced in amplitude by the time it reaches the undersea mine 1000, so that the reduced amplitude noise cancellation signal is closer and anti-phase to the vessel signal 4000.

It is envisaged that when the micro influence generator 100 is used as a mine jamming device, it will similarly be positioned in relatively close proximity (preferably within 2 m to 3 m) to the mine 1000, thereby reducing the amount energy that needs required to generate the acoustic signal required to suppress the incoming acoustic signal 4000 from a vessel 3000. By reducing the amount of energy required to drive the acoustic transducer 102, which in this embodiment is a flexural disc transducer, the battery capacity required can be reduced and the battery life increased. Preferably the mine jamming device 100 would be located within 2 meters of the mine 1000.

As was previously discussed, one advantage of the present invention is the ability to generate relatively low power signals in the vicinity of the mine 1000 leading to less battery demand and longer battery life, and hence longer operational life. It is envisaged that a variant of lithium thionyl chloride (LiSOCl2) is an appropriate battery chemistry due to its high energy density of up to 650 Wh/kg and providing a wide temperature range of −55 to 85 Celsius. Furthermore, a long shelf life of around 10 years is provided with these batteries.

The battery 505 is controlled using a Battery Management System (BMS) 510 which is used to control battery operations and is known in the art.

Acoustic Localisation

It is advantageous for the mine neutralising/jamming device (MIG) 100 to know its approximate orientation with respect to the mine 1000. It is envisaged that after deployment, the MIG 100 will go through an initial set up stage which includes an acoustic localisation phase wherein broadband pulses may be transmitted from the flexural disc transducer 102 and are received by the hydrophone array in order to ascertain the range and bearing of the undersea mine 1000. Alternatively, it is envisaged that the mine countermeasure device 100 can receive a detection signal from an autonomous underwater vehicle (AUV) 5000 indicating the range and bearing of the undersea mine 1000. More preferably, it is envisaged that the detection signal will be indicative of the range and bearing of a sensor on the undersea mine 1000. This allows for the transducers on the mine countermeasure device 100 to use the coils and flexural disc transducer to ensure that the specific sensor position is targeted to ensure that signal received by the sensor at that location closely mimic the signals that would otherwise be received from a target vessel.

In addition to the acoustic localisation it is envisaged that each MIG will incorporate an orientation sensor 512 to gauge its attitude on the bottom of the sea bed. Further, it is envisaged that the micro influence generator 100 may be provided with an anchoring mechanism 701 for anchoring the mine neutralising device. It is envisaged that the mine neutralising device 100 could be anchored to one or both of the seabed and the undersea mine 1000 itself.

In the embodiment shown in FIG. 7, the anchoring mechanism 701 includes a plurality of spike members or spikes 702 that may be driven into the seabed on deployment. The spikes may be pushed downwardly by the mine neutralising device 100 itself once it is located on the seabed, or alternatively, an unmanned underwater vehicle may be used to drive it into the seabed. In an alternative embodiment (not shown), it is envisaged that the anchoring mechanism 701 could include a magnet or some form of clamping arrangement for clamping to the undersea mine 1000.

Outer Case and Coils

Figure 8:
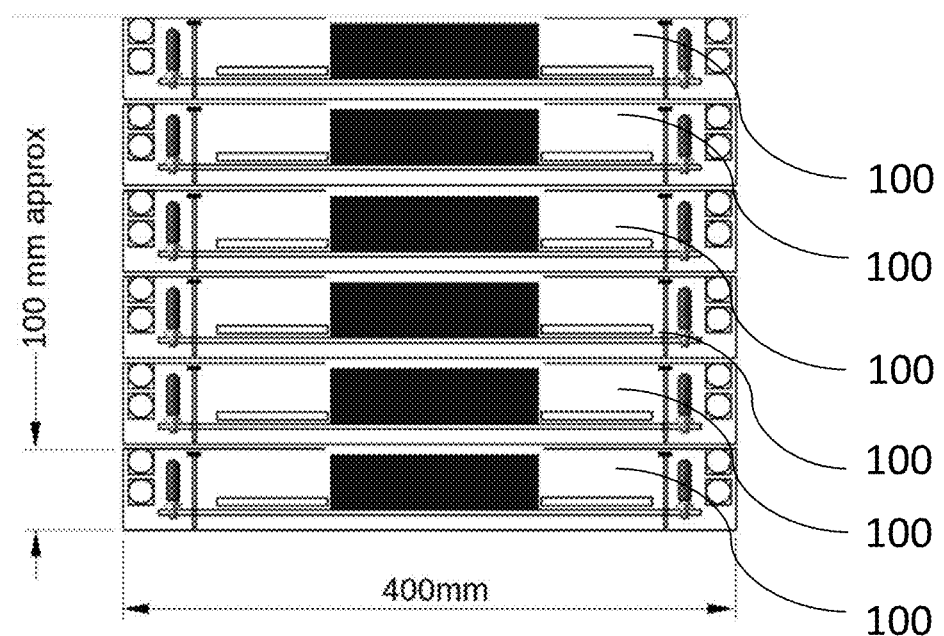
FIG. 8 shows a side elevation view of a plurality of stacked mine jamming/neutralising devices.

As can be seen in FIGS. 7 and 8, the mine neutralising/jamming device includes an outer housing, body or case 700 which houses the electronics in a compact manner. In one embodiment, the housing may include a waterproof portion in which the electronics may be housed. In an alternative embodiment, it is envisaged that the electronics may be encased in a solid block of suitable polymer in order to keep the electronics dry.

The outer case is adapted so it is stackable as is exemplified in FIG. 8, allowing multiple devices 100 to be stacked upon each other. This is particularly advantageous for use in the AUV allowing for a large number of devices to be stacked upon each other.

The outer case 700 is preferably generally disc shaped with a symmetric profile. The disc shape generally defines a pair of opposed major faces 706 and at least one minor face 708. However, alternative configurations are also envisaged, as will be described in more detail below. As can be seen in FIG. 7, the outer case 700 includes spike members 702 which are adapted to embed into a seabed once deployed by an AUV.

Figure 2:
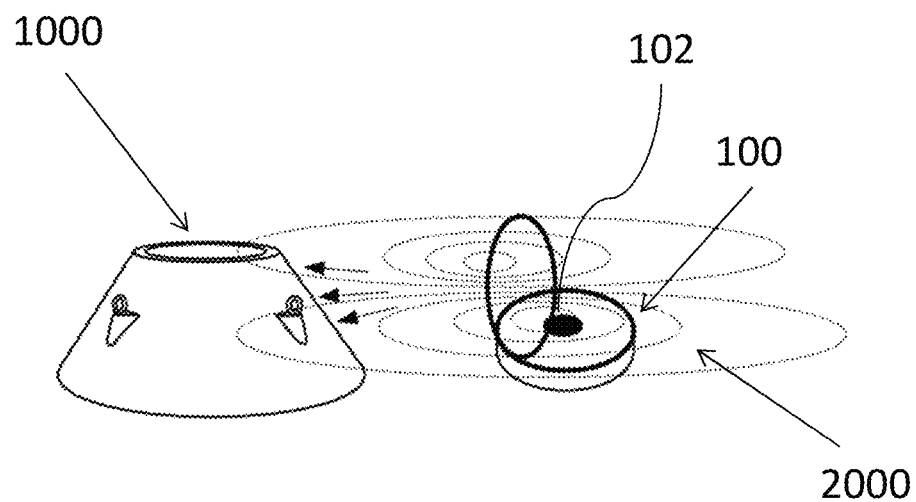
FIG. 2 shows a top perspective view of a mine jamming/neutralising device in use in proximity to an undersea bottom mine.
Figure 3A:
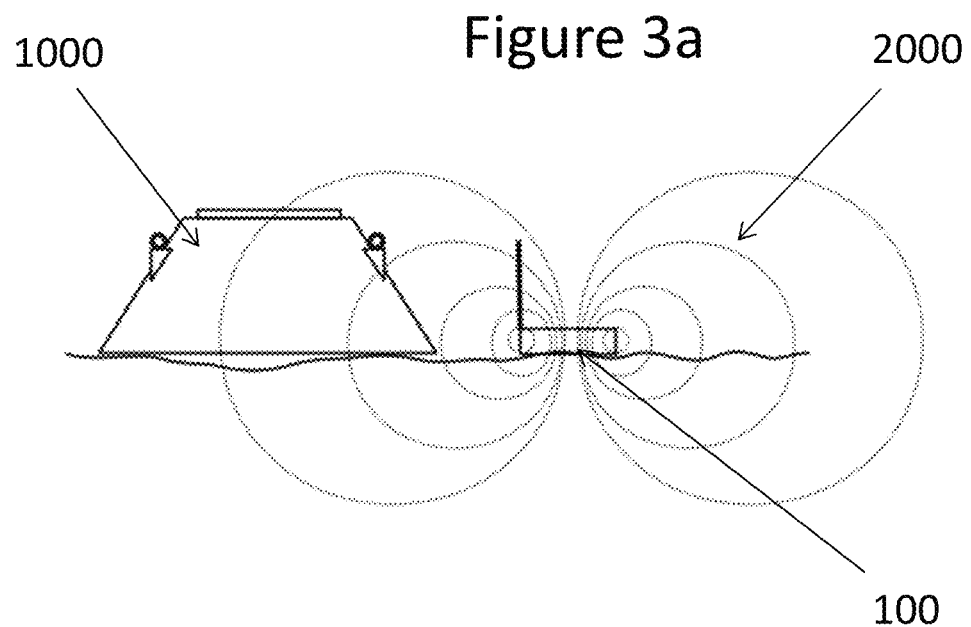
FIG. 3a shows a side elevation view of the mine jamming/neutralizing device of FIG. 2.
Figure 3B:
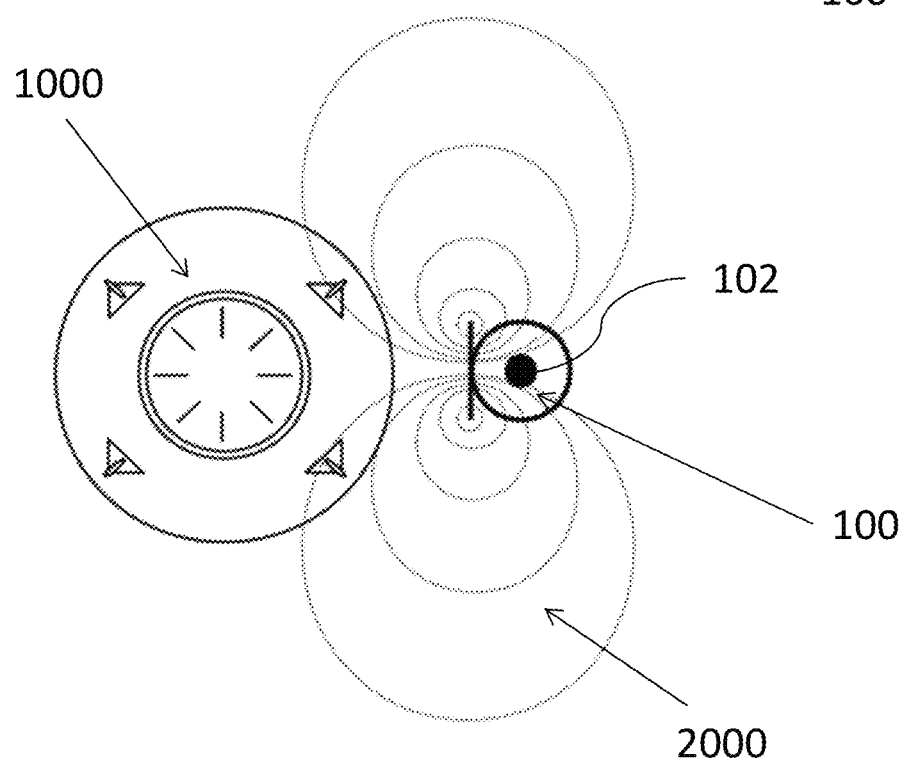
FIG. 3b shows a top view of the mine jamming/neutralising device of FIG. 2.
Figure 12:
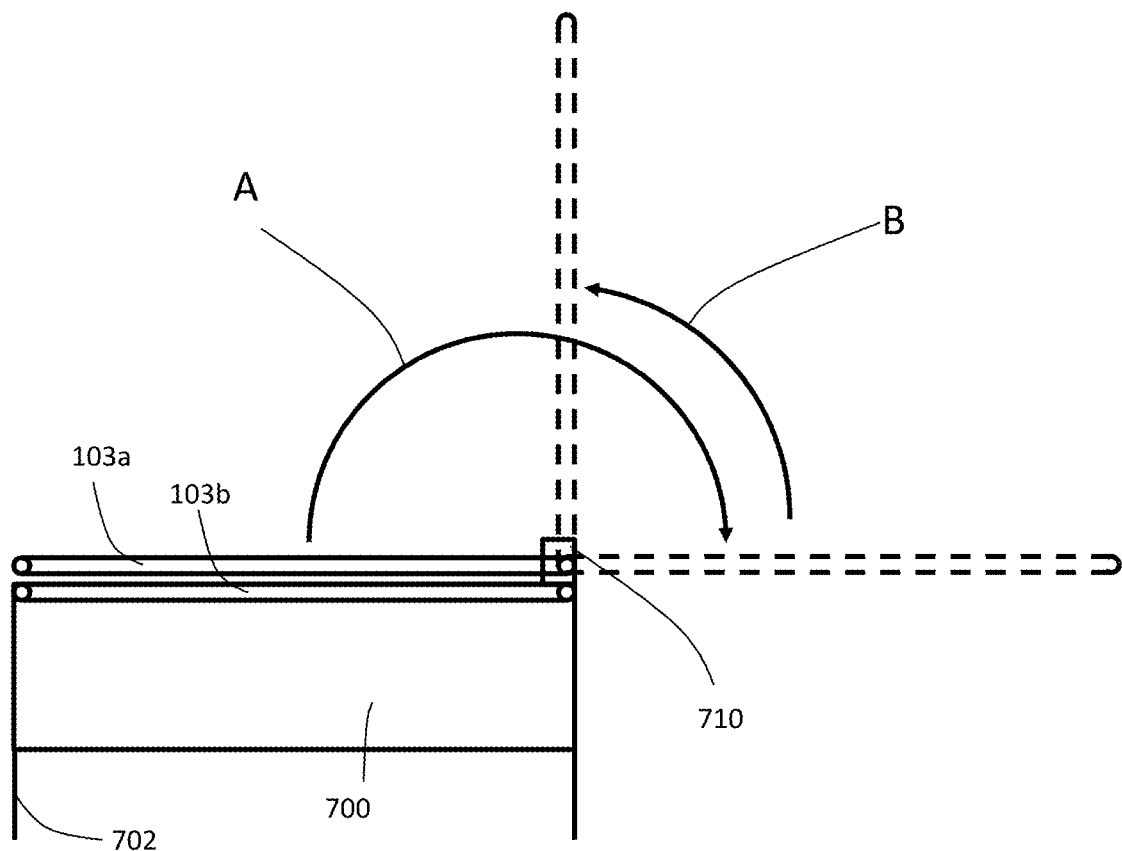
FIG. 12 shows a side elevation view of a mine countermeasure device.

In the embodiment shown in Figures, and exemplified in FIGS. 2, 7 and 12, at least one of the coils is rotatably movable between a sturdy position and a deployed position. In alternative embodiments (not shown), the coils may be slidably movable and/or foldable.

It is envisaged, that if the MIG 100 initially lands upside down on deployment the movement on the coil will position the MIG into its correct upward facing orientation.

Preferably, the mine countermeasure device 100 will include a coil deployment mechanism 710, preferably in the form of a biasing arrangement and/or electrical motor, with a latch. The latch may be configured to be released or actuated by the controller. In one embodiment shown in FIG. 12, the coil deployment mechanism 710 is configured for moving a coil 103b from its stowed position to a position in excess of 90°, and preferably up to 180° (as shown by arrow A) from its stowed position, and then back to a position at 90° from the stowed position (as shown by arrow B). In this way, even if the mine countermeasure device 100 lands upside down, the movement of the coil to 180° (or at least past 90°) will flip the body of the mine countermeasure device be oriented in a correct direction.

It is envisaged that a third coil 103b (shown in FIG. 13) may be provided which may also move beyond 90° and back again, or may just simply move straight to 90° from its stowed position after the first vertical coil 103b has righted the body of the mine countermeasure device. Preferably, the coil 103b will be biased to its stowed position, and an electric motor will move the coil to the 180° position, where after a biasing arrangement, preferably in the form of a spring, will cause the coil to move back to the 90° deployed position. A latch mechanism may be employed to hold the coil in its deployed position. Alternatively, it is envisaged that the biasing arrangement may bias the coils away from their stowed position, and an electrical motor may be used to bring the coils back to 90°, where after they may be latched in place.

Figure 13:
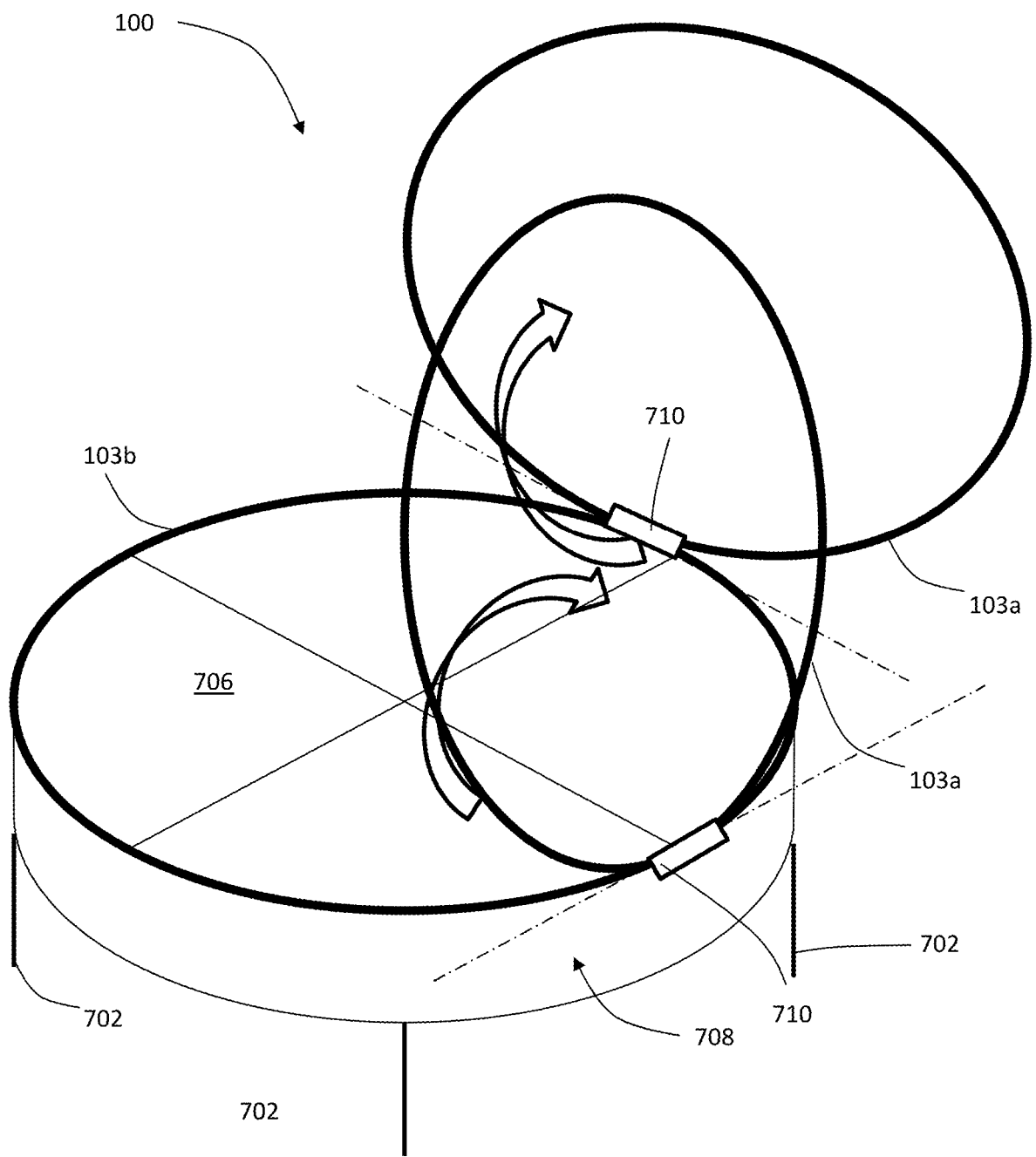
FIG. 13 shows a top front right perspective view of a mine countermeasure device.

Another embodiment of a mine countermeasure device is shown in FIG. 13. In this embodiment, the mine countermeasure device includes three coils. Two of the coils 103b are rotatably attached to the case 700 with a coil deployment mechanism similar to the ones described above. One of the coils 103a is fixedly attached to the case 700, and preferably aligned in parallel with a major face of the outer case 700. After being deployed, each of the movable coils 103b will be rotated to the deployed position. It is envisaged that the coils 103 will be disposed to stack on top of each other in this configuration.

Figure 14:
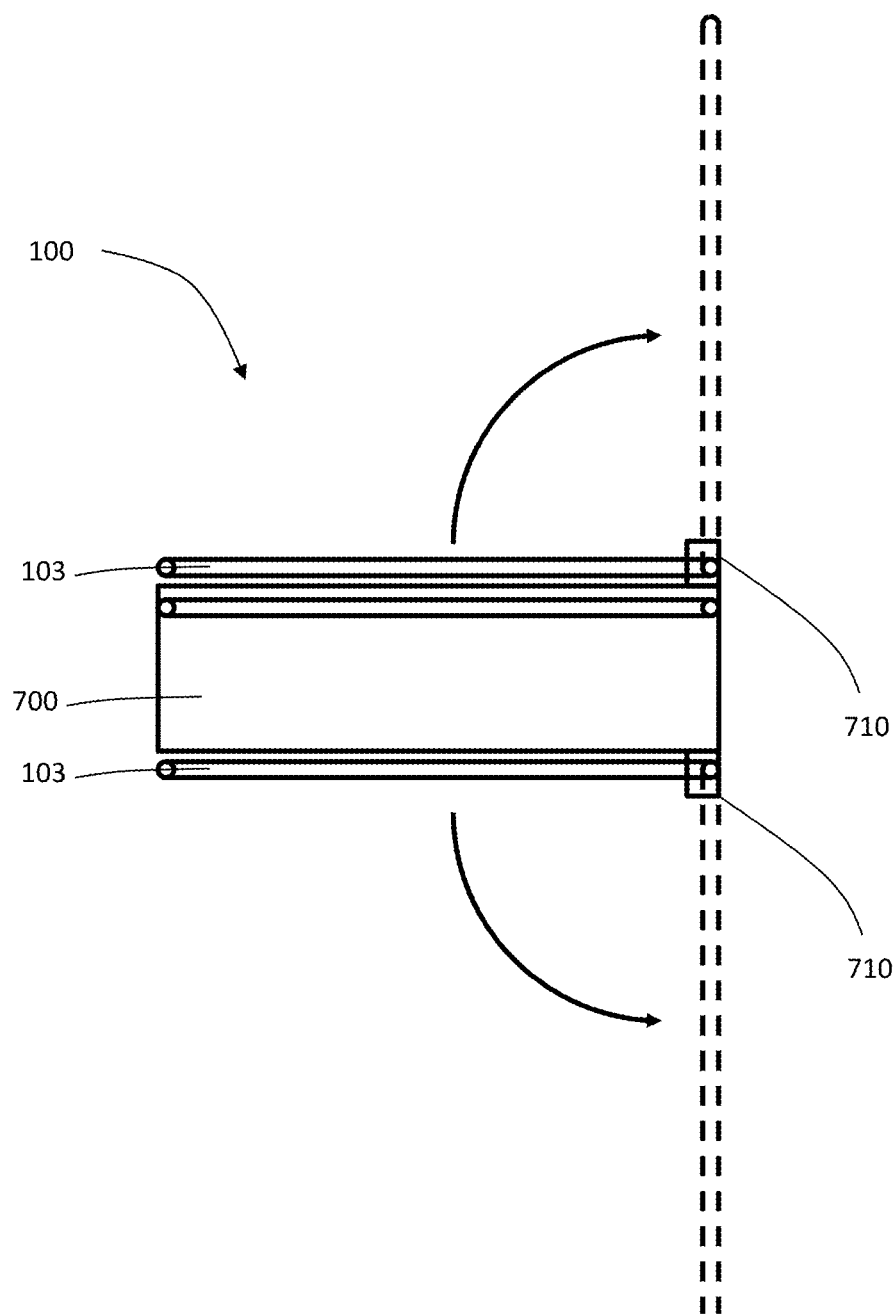
FIG. 14 shows a side elevation view of a mine countermeasure device.

Another embodiment of a mine countermeasure device 100 is shown in FIG. 14. In this embodiment, a pair of rotatable coils 103b is provided. The rotatable coils 103b are located on opposed sides of the case 700. On deployment, the controller will receive a signal from the orientation sensor 512 in order to establish which side is up, and then actuate the deployment mechanism associated with either of the rotatable coils 103b that is on a side of the casing 700 that is upwardly oriented. A further pair of coils may be provided on opposed sides of the casing 700 for generating magnetic field signals in a third dimension.

Figure 15:
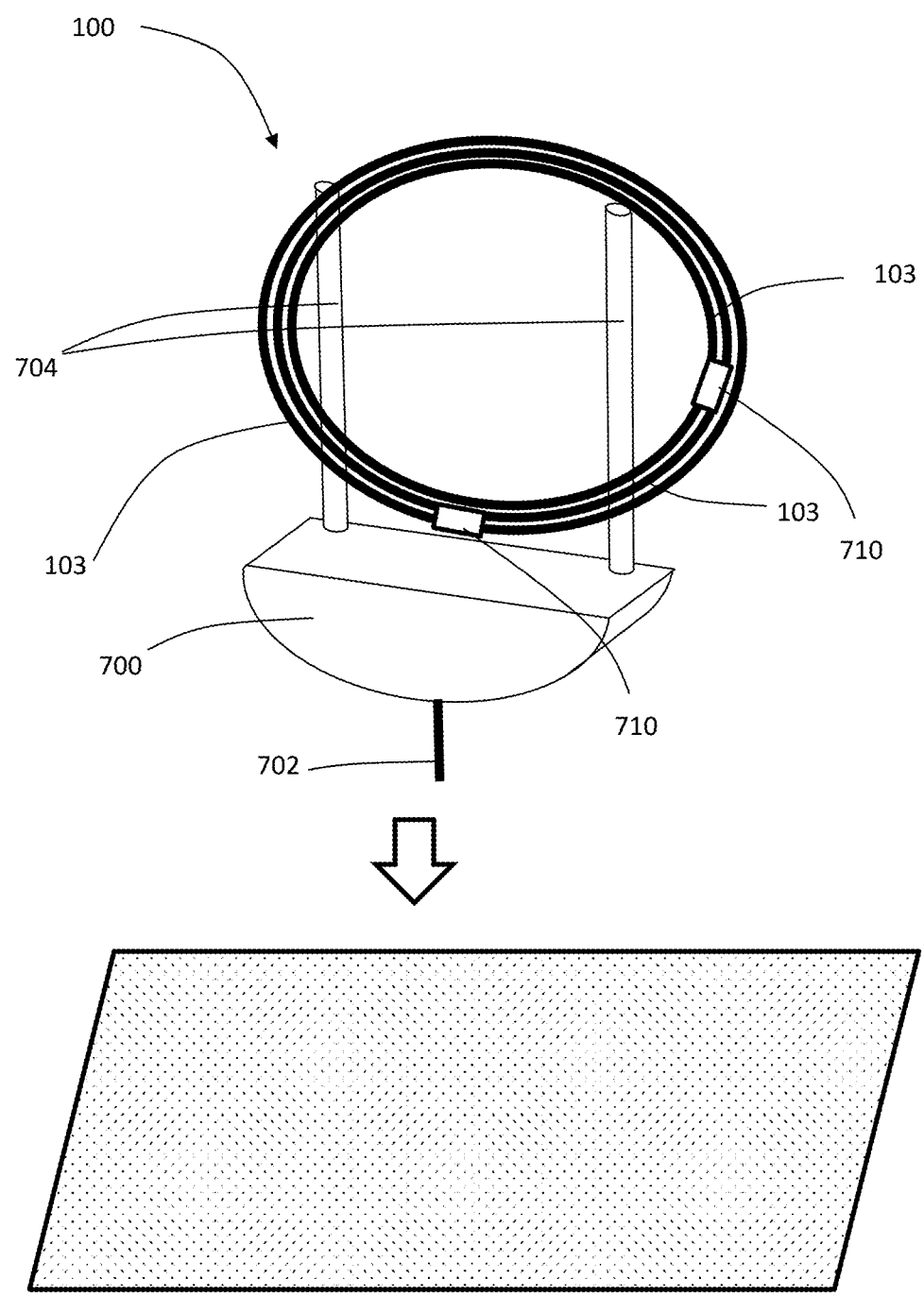
FIG. 15 shows a top right front perspective view of a mine countermeasure device with its coils in a stowed position.
Figure 16:
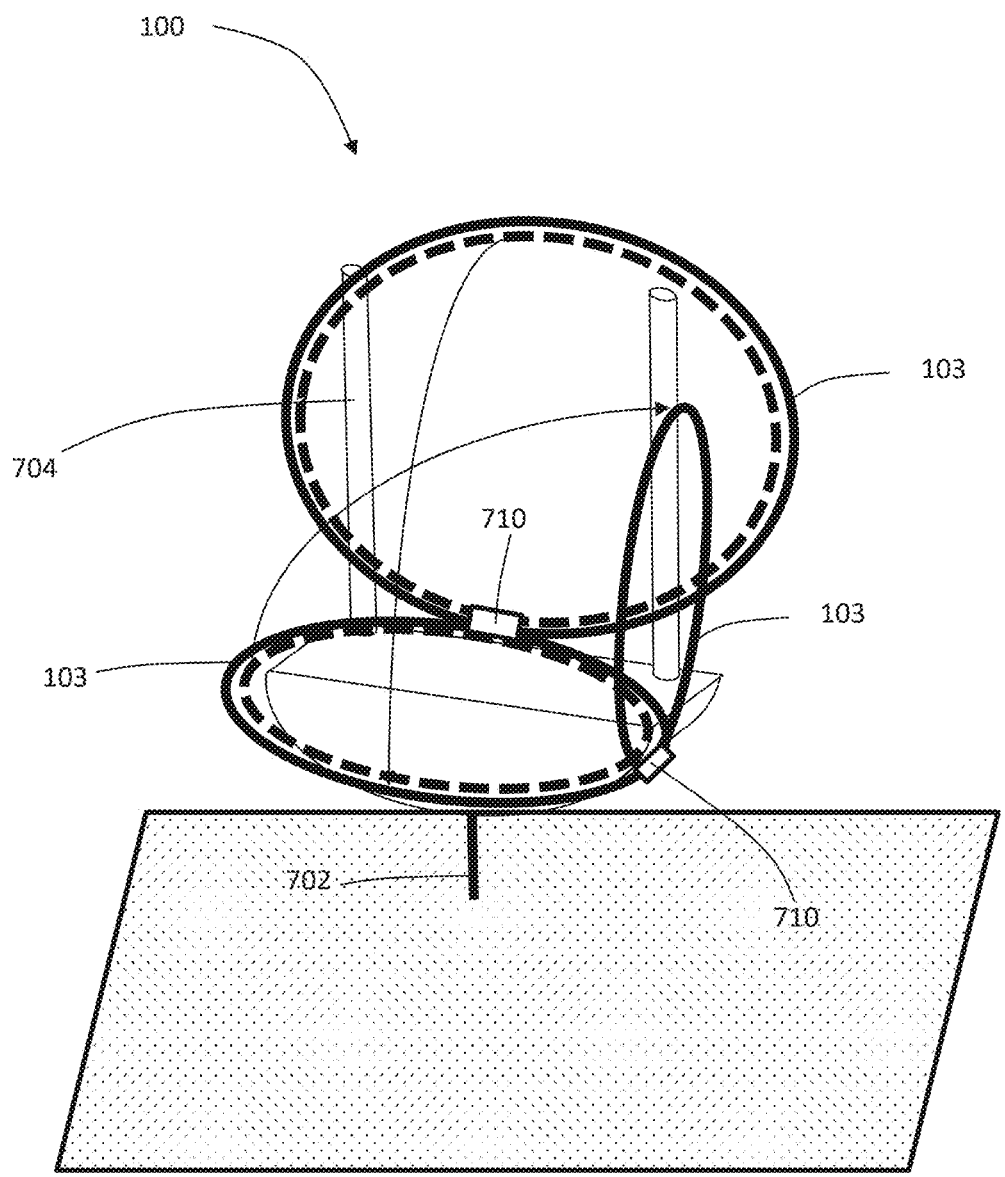
FIG. 16 shows a top right front perspective view of a mine countermeasure device with its coils in a stowed position.

A further embodiment of a mine countermeasure device 100 is shown in FIGS. 15 and 16. In this embodiment, the casing 700 housing the controller and electronics is located to be deployed downwardly. A support frame 704 is provided for supporting the coils. Preferably, the casing 700 is heavier than the coils 103, and on deployment, the mine countermeasure device will align itself correctly with the casing 700 being disposed downwardly. The casing 700 is also preferably provided with a spike member 702 located on the most negatively buoyant side of the mine countermeasure device, the spike member 702 being configured for embedding itself in the seabed.

In this embodiment, a first coil is attached to a second coil by a biasing mechanism, and the second coil is attached to the third coil by a biasing mechanism. The biasing mechanisms preferably biases the coils from their stowed position to their deployed position. The coils are held in position by a latch that can be actuated by the controller to unlatch the coils, thereby allowing the coils to move to their deployed position.

On reaching the seabed, it is envisaged that the coils will be rotated by a coil deployment mechanism from their stowed position in alignment with the direction of travel of the mine countermeasure device on deployment and in which they are all aligned parallel to each other, to a deployed position in which the coils extend transversely to the direction of travel (as shown in FIG. 15), and in which the coils are each at substantially right angles to each other (as shown in FIG. 16).

Figure 17:
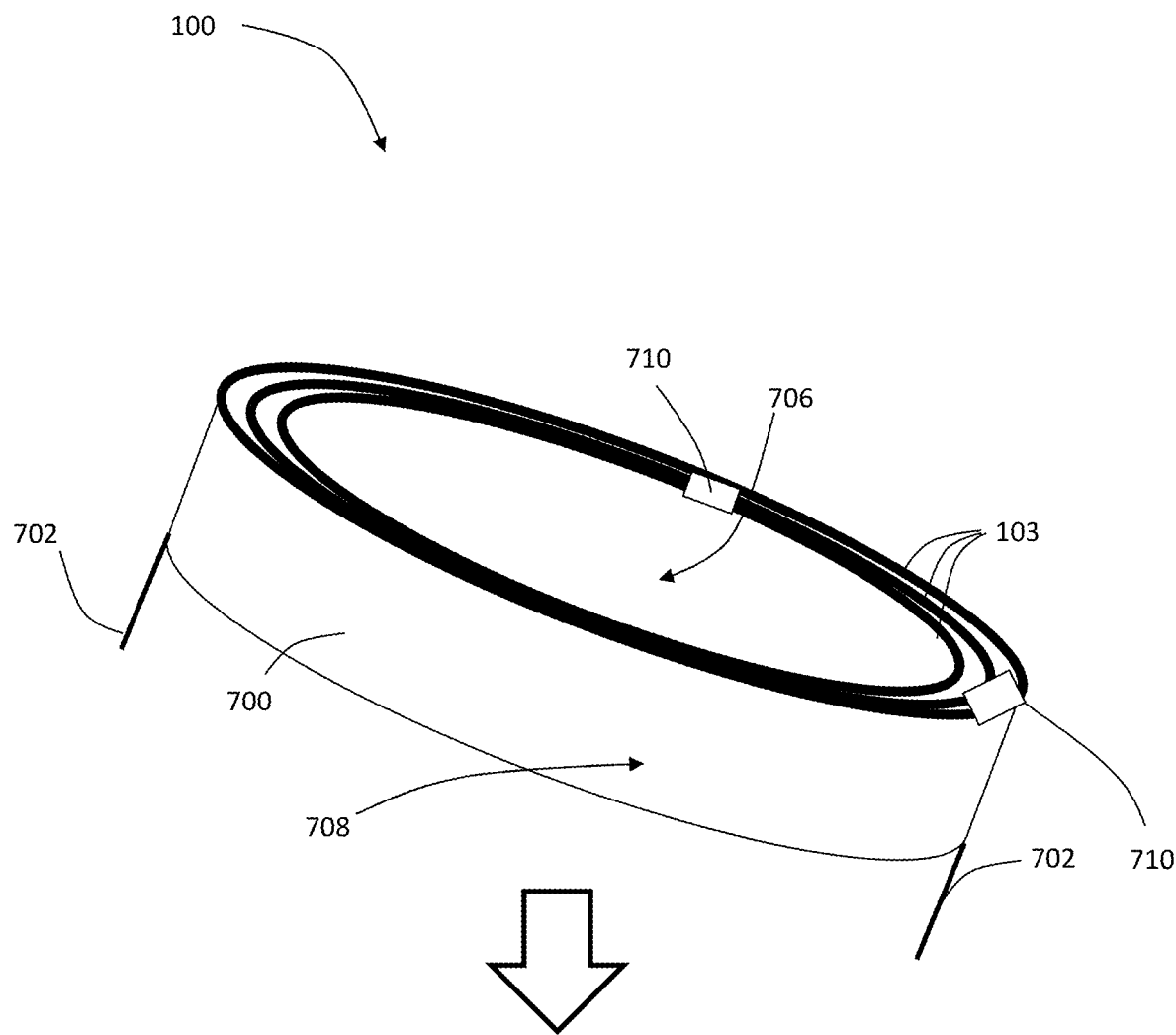
FIG. 17 shows a top front perspective view of a mine countermeasure device with its coils in a stowed position.

In another embodiment shown in FIG. 17, it is envisaged that the mine countermeasure device may be configured to automatically sink through water in an orientation with the casing substantially on its side, and with the coils facing upwardly. This may be achieved by a suitable combination of hydrodynamics and buoyancy.

It is further envisaged that the buoyancy of the mine countermeasure device 100 can include a buoyancy arrangement 720 that is able to alter the buoyancy of the mine countermeasure device on deployment. Preferably, before the mine countermeasure device 100 is deployed, for example from an AUV 5000, the buoyancy of the mine countermeasure device will be neutral. This will facilitate the transport of the mine countermeasure devices 100 in an autonomous underwater vehicle 5000, especially where the autonomous underwater vehicle does not have its own active buoyancy system, and instead relies on control surfaces to affect its buoyancy.

Once deployed, it is envisaged that the buoyancy of the mine countermeasure device will be altered by the buoyancy arrangement 720 to be negatively buoyant, to enable the mine countermeasure device to sink to the seabed.

Figure 18A:
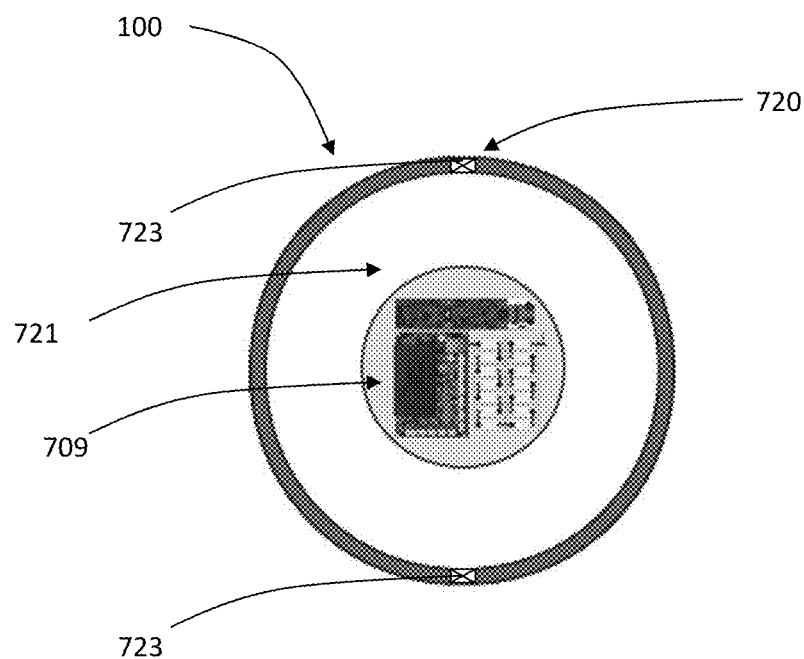
FIG. 18a shows a cutaway top view of a mine countermeasure device in a neutrally buoyant state with the buoyancy chamber filled with air.
Figure 18B:
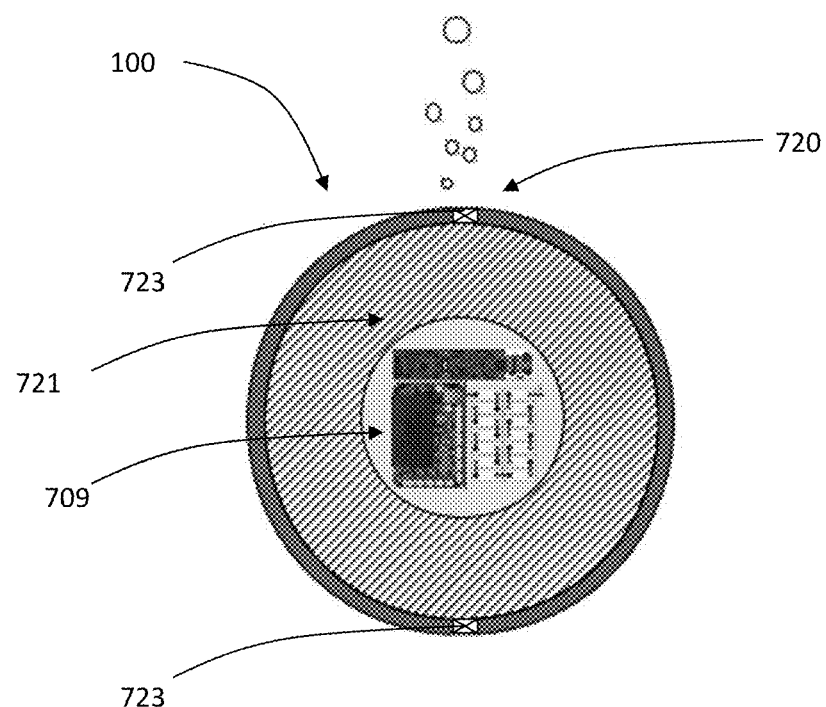
FIG. 18b shows a cutaway top view of a mine countermeasure device in a negatively buoyant state with the buoyancy chamber filled with water.
Figure 19A:
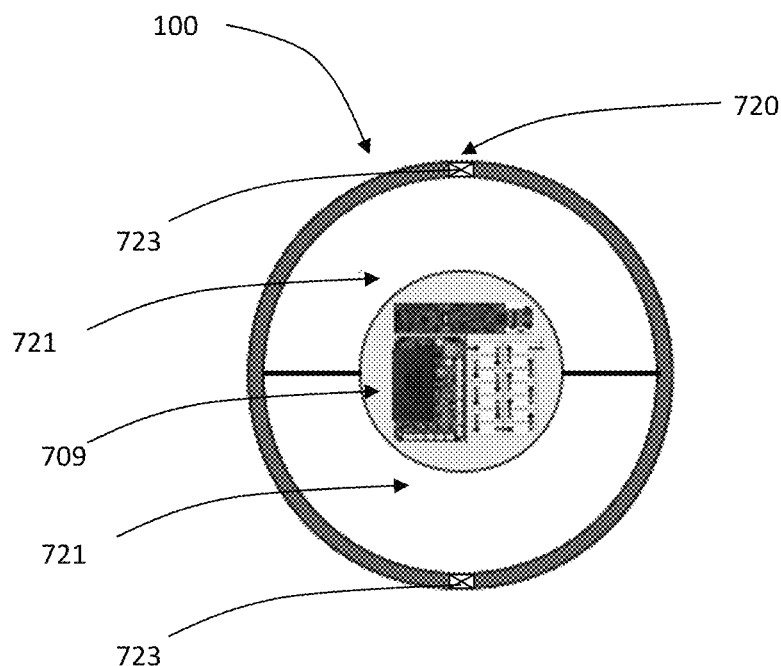
FIG. 19a shows a cutaway top view of a mine countermeasure device in a neutrally buoyant state with all of the buoyancy chambers filled with air.
Figure 19B:
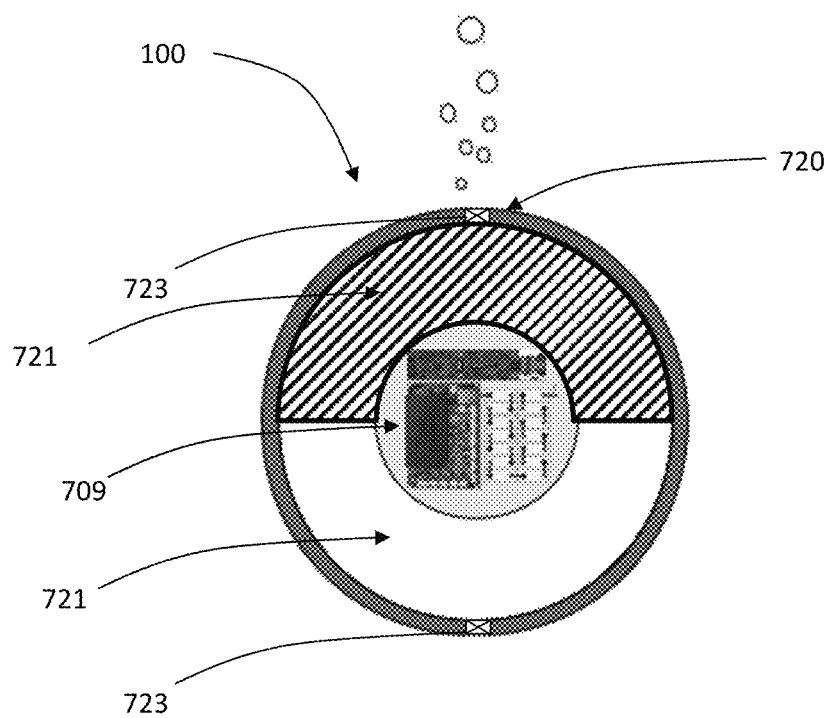
FIG. 19b shows a cutaway top view of a mine countermeasure device in a negatively buoyant state with one of the buoyancy chambers filled with air.

In the embodiments shown in FIGS. 18 and 19, it may be seen that the casing 700 will preferably include a buoyancy chamber 721 that will initially include a gas (preferably air) while being transported by the AUV 5000. On deployment from the AUV, the buoyancy chamber 721 will be filled with seawater to alter the buoyancy of the mine countermeasure device 100 to being negative buoyancy. As may be seen from FIG. 19, the buoyancy of the buoyancy chamber can be filled to weigh down one side of the mine countermeasure device to control its descent. It is envisaged that a plurality of buoyancy chambers may be provided with closures that are controllable by the controller to be fillable in a particular order, or on receiving feedback from an orientation sensor 512, in order to ensure that the orientation of the mine countermeasure device is correct once it lands on the seabed. The orientation sensor may include an accelerometer and/or gyroscope.

It is further envisaged that spike members 702 may be provided on the side that is most negatively buoyant to ensure that the spikes embed themselves in the seabed when the mine countermeasure device 100 lands on the seabed.

Figure 20:
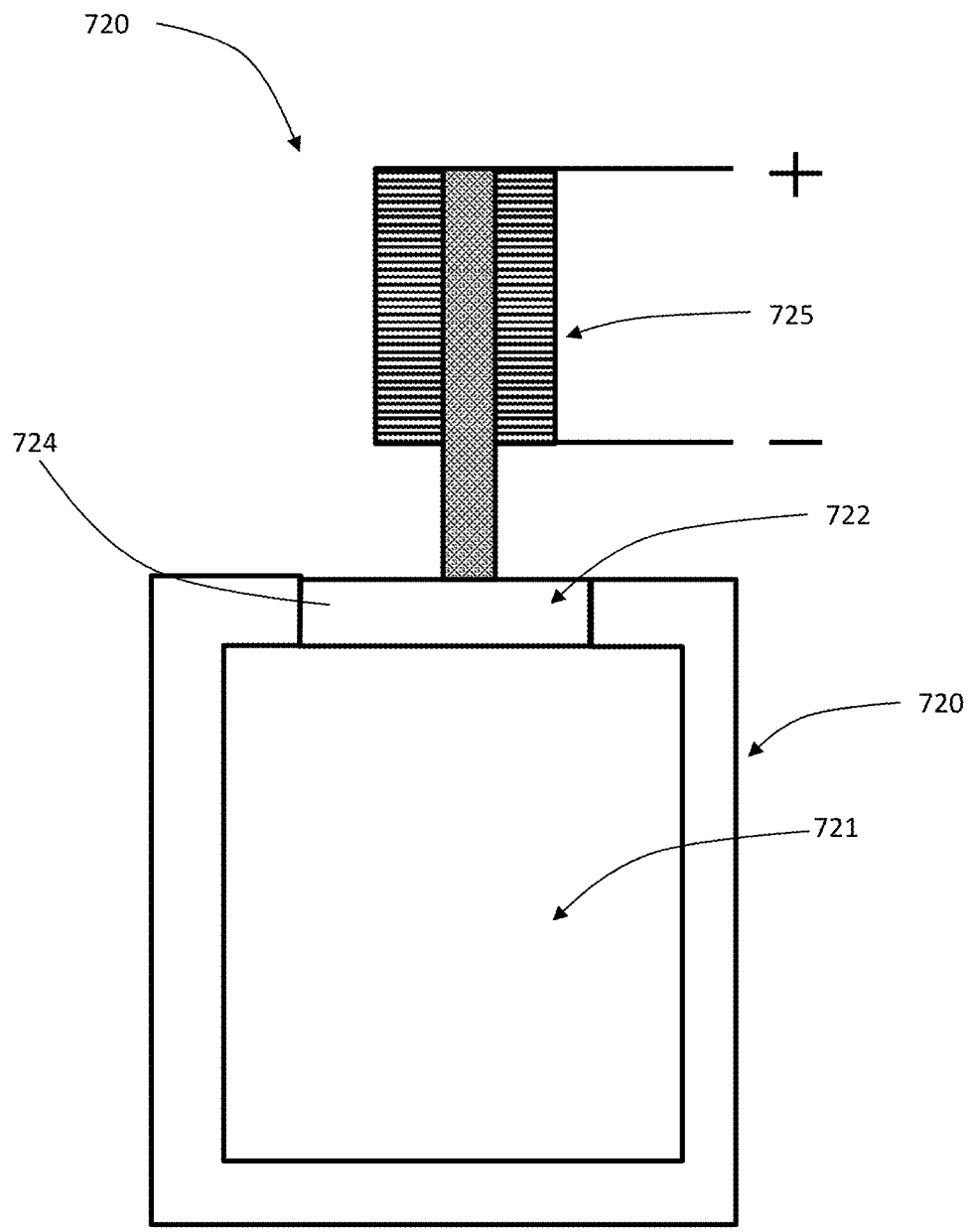
FIG. 20 shows a schematic illustration of a buoyancy arrangement.

It is envisaged that each of buoyancy chamber 721 will include a closure 722 that can be opened by the controller. The closure 722 may be in the form of a control valve 723 that is actuatable by the controller (as shown in FIG. 19). Alternatively, the closure could be a frangible closure such as a piece of glass 724 that may be broken by a solenoid 725 (as shown in FIG. 20). It is further envisaged that the controller of the mine counted measure device may be configured to autonomously control the buoyancy of the buoyancy arrangement.

Alternatively, in another embodiment (not shown) it is envisaged that the buoyancy arrangement may be altered by a deployment mechanism on the AUV on deployment of the mine countermeasure device.

Mine Countermeasure Device with Three-Dimensional Field Controller

By providing a mine countermeasure device with at least a pair of coils angled at right angles to each other, it is envisaged that the controller will be able to control a plurality of coils to synthesise the magnetic field at a particular three-dimensional location in space, and preferably at the location of a magnetic field sensor on the undersea mine 1000 located adjacent the mine countermeasure device.

As mentioned previously, the mine countermeasure device will be able to detect the bearing and range of the undersea mine 1000, and may also be able to detect the shape of the undersea mine. The mine countermeasure device may also have access to a database of known undersea mines on the memory that will allow it to retrieve information indicating where the electromagnetic sensors are on the mine.

Alternatively, as discussed above, that is envisaged that the mine countermeasure device 100 may receive a detection signal from a AUV 5000 setting out the location of the sensors on the undersea mine.

The controller can then control the flow of current through the coils to generate a magnetic field having a flux density that varies over time at a position corresponding to the location of at least one or more magnetic field sensors on the undersea mine in order to simulate a ships signature.

By providing three coils that define planes that are oriented at right angles to each other, the strength and direction of a magnetic field can be controlled in three dimensions.

It is envisaged that the controller will utilise a mathematical model to control the synthesising of the magnetic fields and flux density is at the sensors on the undersea mine.

Preferably, the mathematical model is a set of equations relating the current in a current loop in the coil parameterised by one or more selected from radius, position and orientation, to the resulting flux density components along the X, Y and Z axes at locations (x, y, z). Preferably the mathematical model is a matrix equation as follows:

$$\begin{bmatrix} B_x \\ B_y \\ B_z \end{bmatrix} = \begin{bmatrix} \hat{B}_{x1} & \hat{B}_{x2} & \cdots & \hat{B}_{xn} \\ \hat{B}_{y1} & \hat{B}_{y2} & \cdots & \hat{B}_{yn} \\ \hat{B}_{z1} & \hat{B}_{z2} & \cdots & \hat{B}_{zn} \end{bmatrix} \begin{bmatrix} I_1 \\ I_2 \\ \vdots \\ I_n \end{bmatrix}$$

where
$\hat{B}_{xn}$ is x component of the magnetic flux density due to a unit current in coil n
$B_x$ is the total x component of the flux density due to currents flowing in n coils
$I_n$ is the current flowing in coil n
n is the number of coils
By solving for the above matrix equation, we get:

$$\begin{bmatrix} I_1 \\ I_2 \\ \vdots \\ I_n \end{bmatrix} = \begin{bmatrix} \hat{B}_{x1} & \hat{B}_{x2} & \cdots & \hat{B}_{xn} \\ \hat{B}_{y1} & \hat{B}_{y2} & \cdots & \hat{B}_{yn} \\ \hat{B}_{z1} & \hat{B}_{z2} & \cdots & \hat{B}_{zn} \end{bmatrix}^+ \begin{bmatrix} B_x \\ B_y \\ B_z \end{bmatrix}$$

where
$\hat{B}_{xn}$ is the x component of the magnetic flux density due to a unit current in coil n;
$B_x$ is the total x component of the flux density due to currents flowing in n coils;
$I_n$ is the current flowing in coil n; and
n is the number of coils.
When three coils are used, the pseudo-inverse matrix $$\begin{bmatrix} \hat{B}_{x1} & \hat{B}_{x2} & \cdots & \hat{B}_{xn} \\ \hat{B}_{y1} & \hat{B}_{y2} & \cdots & \hat{B}_{yn} \\ \hat{B}_{z1} & \hat{B}_{z2} & \cdots & \hat{B}_{zn} \end{bmatrix}^+$$

is simply the inverse matrix.

Where only to coils provided, the mathematical model may be the solution to an optimization equation where the error between the desired magnetic field and the magnetic field generated is minimised.

The optimisation equation is:

$$E = (B_z - B'_z)^2 + (B_h - B'_h)^2$$

where $$B'_h = \sqrt{(B_{x1} + B_{x2})^2 + (B_{y1} + B_{y2})^2}$$

and where
E is the error between the desired magnetic field and the magnetic field generated;
$B_h$ is the desired magnetic field amplitude in the horizontal plane irrespective of direction of the vector;
$B_{xn}$ is the x component of the magnetic flux density due to a unit current in coil n; and
$B_{yn}$ is the y component of the magnetic flux density due to a unit current in coil.

It is further envisaged that the controller will control the operation of the transducers (either or both of the coils and the flexural disk transducer) in accordance with a physics-based mathematical model or of a vessel, in order to more closely mimic the vessel signature. The physics-based mathematical model may be stored on the storage memory 501. It is further envisaged that the controller will control the flexural disc transducer to generate both broadband and narrowband acoustic signature components in accordance with the physics-based mathematical model.

It is further envisaged that the mine countermeasure device 100 can include a self-destruct mechanism. The self-destruct mechanism is preferably operable to prevent the mine countermeasure device being recovered and reverse engineered. The self-destruct mechanism preferably includes a timed sequence may delete the software and/or data on the memory. The self-destruct sequence may further include the actuation of a short-circuit of the electronic circuitry across the battery terminals to prevent recovery of information from the electronic componentry. In an alternative and/or additional embodiment, it is envisaged that the self-destruct mechanism may cause the ingress of seawater into the waterproof portion 709. Where the waterproof portion consists of electronic componentry set into settable polymer, then this may not be possible. The timing sequence of the self-destruct mechanism may operate on the basis of degradation of materials and/or be a timed electronic sequence.

ACOMMS

Preferably, the mine countermeasure device or micro influence generator (MIG) 100 will include some form of transceiver 528 for receiving and transmitting data to and from the MIG 100. It is envisaged that the transceiver 528 could operate on the basis of optical communications, acoustic communications, or radiofrequency communications. Preferably, the MIG 100 will be individually addressable via JANUS underwater acoustic communications (ACOMMS). This will allow for mine clearance divers equipped with hand-held sonars to readily re-acquire previously deployed MIGs 100 along with their targets should neutralisation attempts fail.

In other embodiments, it is envisaged that the MIGs 100 can be programmed with an inertially referenced position estimate prior to deployment, where each new MIG 100 augments a long-baseline navigation network which can improve the ability of subsequent AUVs and divers to navigate while removing their requirement to periodically surface for Global Positioning Satellite (GPS) fixes.

Preferably the mine countermeasure devices are capable of communicating directly with each other and passing on messages and/or instructions.

LBL Navigation

Another feature of the jamming/neutralizing device MIG is its ability to be used for long base line (LBL) navigation allowing for the accurate location of mines.

One of the deficiencies that continues to plague mine counter measure AUVs is the drift of inertial navigation systems (INS) during extended missions. INSs are unlikely to achieve positional accuracies much greater than 0.1% of distance travelled, meaning that the AUV and its detected targets gradually accumulate uncertainty throughout the mission without periodic surfacing to re-establish a GPS fix. As each MIG is adapted to support ACOMMS and ranging capability with an accuracy of the order of 0.5 metres or better, it is envisaged that LBL navigation would be added to the capability of the MIG 100.

Exemplified in FIG. 6 is a motherboard layout envisaged for a 6×8 inch board of a MIG 100. As can be seen, the layout comprises a processor labeled TX2i module, the TX2i module has been chosen due to its durability and general build quality which is important from a reliability perspective. It will be appreciated by the person skilled in the art that equivalent processors may be used with similar results.

The mine neutralising device 100 described above in its various embodiments can be used in a variety of ways to make safe or otherwise nullify undersea mines 1000. One of these ways is by neutralising the undersea mine 1000 to cause it to detonate. In order to do this, a synthetic signal is generated that fools the mine into believing that it has detected a target vessel, causing itself to detonate. A second way is to jam the undersea mine 1000, while having it remain undetonated. There are two ways to jam an undersea mine 1000. One way of jamming an undersea mine is to transmit a cancellation signal that cancels the signal emitted by a vessel that would cause a mine to detonate. Another way of jamming an undersea mine is to transmit a masking signal that overwhelms the sensors used by the undersea mine to detect a vessel.

Autonomous Underwater Vehicle

Now further described in more detail with reference to FIGS. 21-24, and 27, there is provided an autonomous underwater vehicle (AUV) 5000. The AUV 5000 includes a controller 5100 for controlling operation of the AUV 5000. The AUV further includes a storage in the form of storage hold or cargo bay 5200, preferably located within the hull of the AUV, in which a plurality of mine countermeasure devices 100 can be stored, preferably in a stacked or nested configuration.

The AUV 5000 further includes an inertial navigation system (described below) as is known in the art. The inertial navigation system may include orientation sensors such as one or more accelerometers and/or gyroscopes.

A prime mover 5300 is provided, preferably in the form of an electric motor (not shown) that drives a propeller 5310 and/or waterjet for propelling the AUV 5000 is provided. A rudder (not shown) or alternately other control surfaces are preferably provided for steering and/or control of the AUV as is known in the art. Alternatively, if a waterjet is provided, this may be directed by a water jet directing mechanism (not shown) in order to control movement of the AUV. Such a rudder and/or waterjet directing mechanisms are known in the art, and a discussion on the workings of these is considered beyond the scope of this specification.

The AUV 5000 further includes a controller that will be described in more detail below. It is envisaged that the AUV 5000 will typically not include an active ballast system for controlling its own buoyancy, and will instead utilise control surfaces for controlling its depth. However, in alternative embodiments, it is envisaged that an active ballast system may be provided for controlling the buoyancy of the AUV 5000.

Where the AUV 5000 does not include an active ballast system, it is important that the buoyancy of the mine countermeasure devices 100 in the cargo bay 5200 are neutrally buoyant as this will facilitate the more accurate control of the AUV 5000, without having to compensate for the buoyancy of the mine countermeasure devices.

Figure 22A:
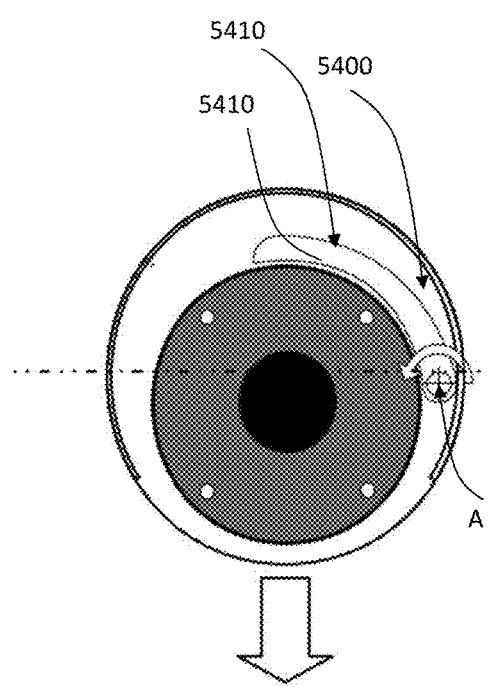
FIG. 22a shows a front cutaway view of a cargo bay of an underwater transport showing a mine countermeasure device about to be deployed by a device deployment system.
Figure 22B:
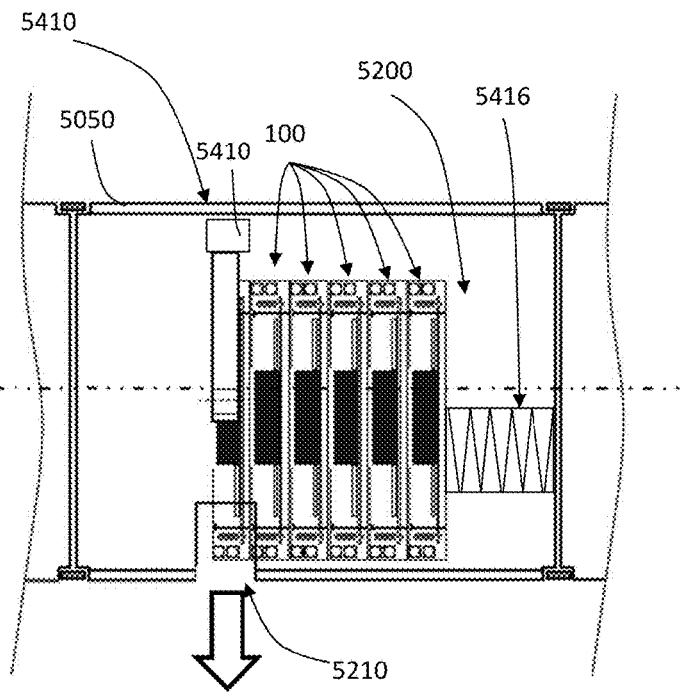
FIG. 22b shows a side elevation cutaway view of an underwater transport showing a plurality of mine countermeasure devices stored in a cargo bay for deployment by a device deployment system.

In a first embodiment shown in FIGS. 22a and 22b, the cargo bay 5200 is preferably located within the cylindrical hull 5050 of the AUV 5000. The AUV is further provided with a deployment system 5400 configured for deploying a plurality of mine neutralising devices that are stored in the cargo bay 5200.

The deployment system 5400 preferably includes an ejection mechanism 5410 for ejecting mine countermeasure devices from the cargo bay 5200. In the embodiment shown in FIGS. 22 and 23, the ejection mechanism includes a rotatable arm 5412. The rotatable arm 5412 is configured for pushing individual mine countermeasure devices 100 out of the cargo bay 5200 via an aperture 5210 in the form of a slot. Rotatable arm 5410 rotates in a reciprocating fashion around axis As shown in FIG. 22*a*. As mine countermeasure device 100 is pushed out of aperture 5210, the rotatable arm 5410 retracts to its original position and a moving mechanism 5416, preferably in the form of a spring, moves the next mine countermeasure device 100 into position for deployment. In alternative embodiments, other moving mechanisms may be used such as a linear motor and/or a piston and cylinder arrangement.

In other embodiments It is envisaged that the deployment system could include other movable deployment mechanisms such as linear motors, piston and cylinder arrangements, or the like.

As may be seen from FIG. 22*b*, the mine countermeasure devices 100 are preferably packed tightly together in a stacked or nested fashion to form a magazine of mine countermeasure devices 100. It is anticipated that in use, a single AUV 5000 will be deployed from a warship or aircraft, and be able to move to a danger zone where undersea mines have previously been detected. The danger zone may be a distance of up to 50 km away (i.e. over the horizon). By providing a magazine of mine countermeasure devices, a single vessel can be used to deploy many (preferably tens or even hundreds) mine countermeasure devices to an area directly adjacent the undersea mines.

In alternative embodiments (not shown), it is envisaged that the cargo bay 5200 may be provided within a capsule attachable to an AUV, although this is not preferred as it will increase the drag on the AUV.

It is anticipated that deploying a mine countermeasure device out of the aperture 5210 in a direction directly transfers to the direction of movement of the AUV 5000 may be problematic in that hydrodynamic drag on the mine countermeasure device 100 may cause it to be caught in the aperture on deployment. For this reason, alternative embodiments are also provided that take this into account.

Figure 23A:
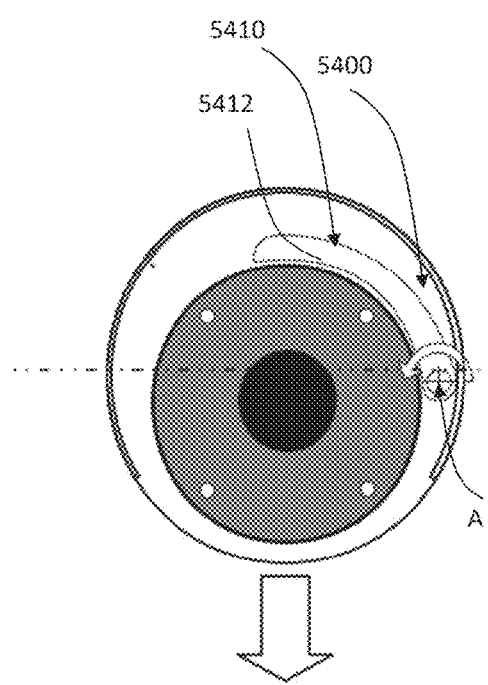
FIG. 23a shows a front cutaway view of a cargo bay of an underwater transport showing a mine countermeasure device about to be deployed by device deployment system.
Figure 23B:
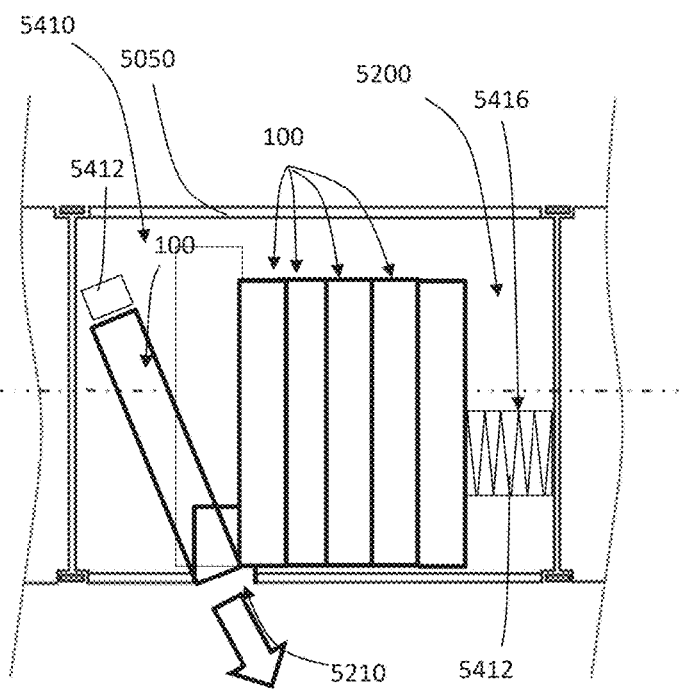
FIG. 23b shows a side elevation cutaway view of an underwater transport showing a plurality of mine countermeasure devices stored in a cargo bay for deployment by a device deployment system.

Now described with reference to FIGS. 23*a* and 23*b*, another embodiment is exemplified in which a similar deployment mechanism is used. However, the mine countermeasure device 100 is not deployed in a direction directly at right angles to the direction of movement of the AUV. Instead, the mine countermeasure device is ejected from the AUV with a rearward velocity component and in a direction shown by the arrow.

It is also anticipated that in alternative embodiments (not shown), similar features could be used to provide a forward velocity component on injection.

Figure 24:
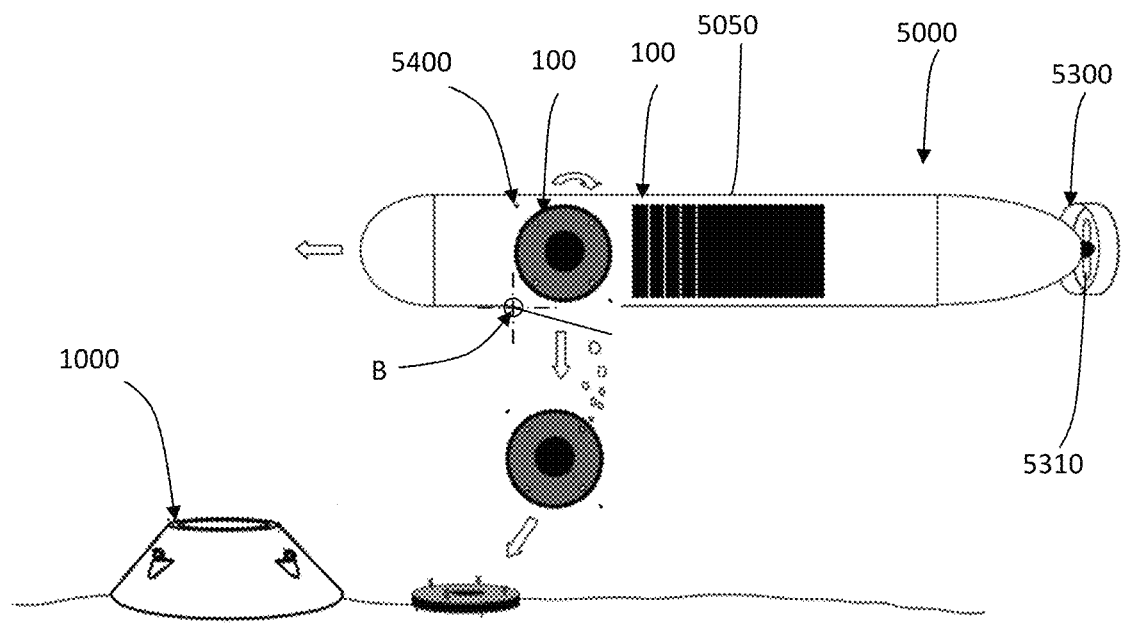
FIG. 24 shows a side elevation view of an underwater transport deploying a mine countermeasure device onto a seabed alongside an undersea mine.
Figure 25:
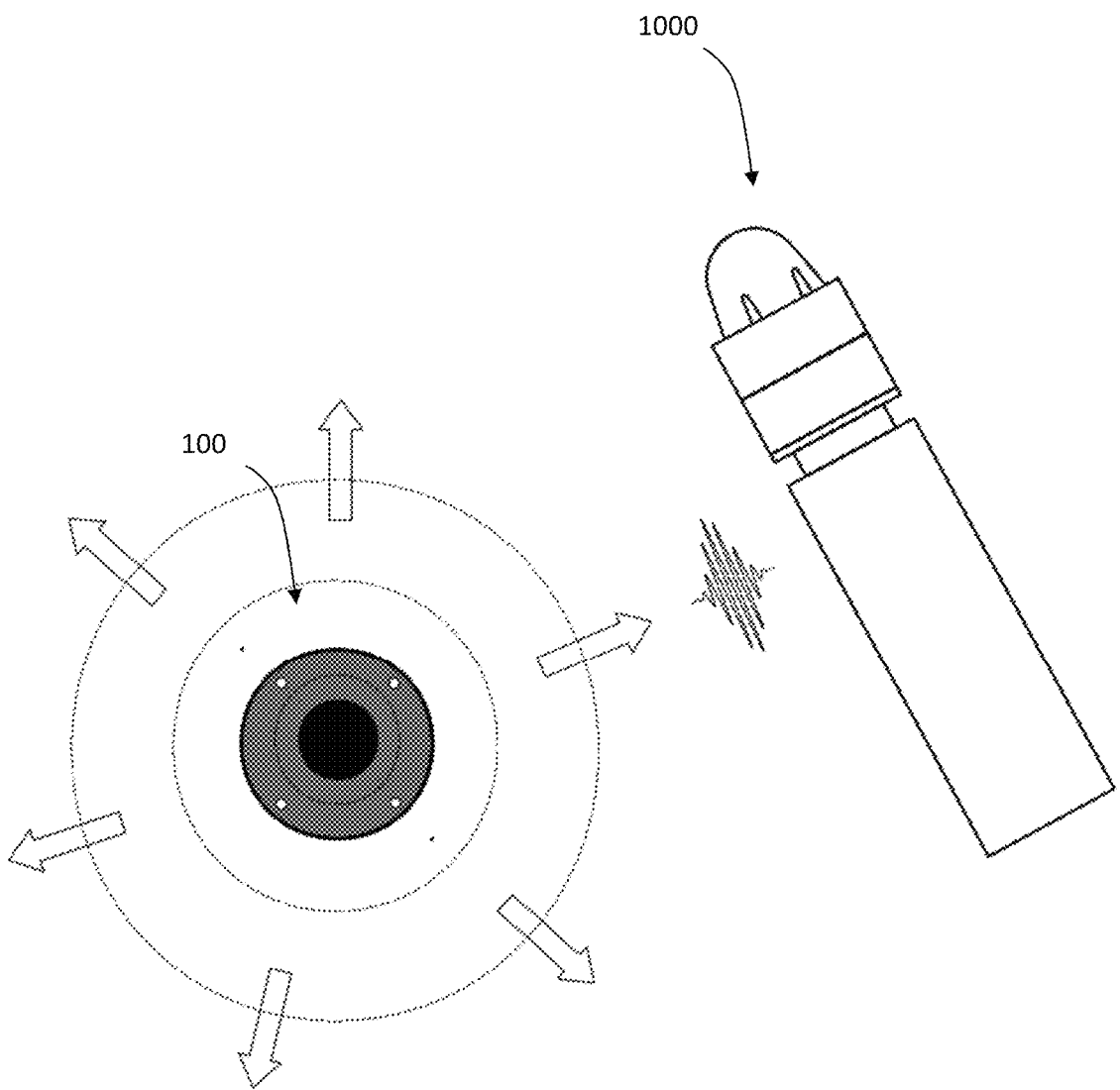
FIG. 25 shows a top view of a mine countermeasure device emitting an acoustic pulse towards an undersea mine.
Figure 26:
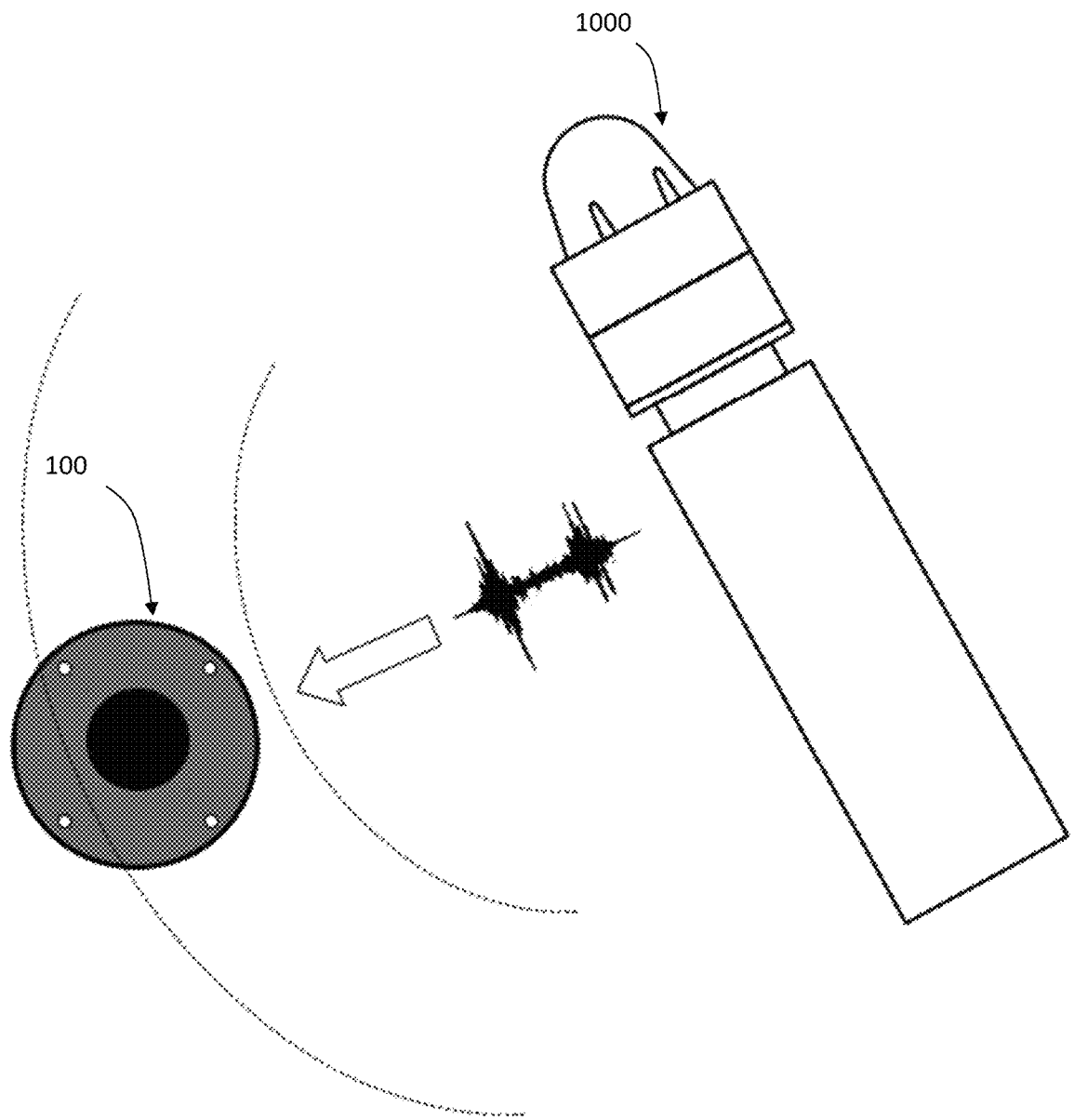
FIG. 26 shows a top view of a mine countermeasure device receiving a reflected pulse from an undersea mine.

Another embodiment of an AUV with a deployment mechanism 5400 is shown in FIG. 24. In this embodiment, the deployment mechanism includes a rotating mechanism that turns the next mine countermeasure device to be deployed through 90° before rejecting the mine countermeasure device 100 through aperture 5210. In such an embodiment, the aperture 5210 would be in the form of a slot that is aligned with the length of the cylindrical hull 5050 of the AUV 5000. It is anticipated that moving the mine countermeasure device so that its major faces are aligned with the direction of travel will facilitate ease of deployment of the mine countermeasure device.

It will be apparent to those skilled in the art that a wide variety of mechanisms could be used to rotate in the mine countermeasure device through 90° before deployment.

For example, a jaw type mechanism could be used to grab the mine countermeasure device and move it away from the other mine countermeasure devices, and an electrical motor could be used to turn the jaw mechanism through 90°.

Alternatively, the mine countermeasure devices may be located on a track for guiding movement of the mine countermeasure devices. As the mine countermeasure devices are pushed towards the aperture 5210, the track may cause the rotation of the front most mine countermeasure device.

A pivoting closure 5414 may be provided over the aperture 5210 with a light spring that bias is the closure to a closed position in which the aperture 5210 is restricted. The closure pivots about axis B as shown in FIG. 24. The closure 5414 supports the front most mine countermeasure device 100 in place until ejection mechanism 5410 operates to push it out of the aperture 5210.

Further, it is envisaged that the AUV 5000 may include a device for breaking a frangible closure 722, or opening a closure to the buoyancy chamber 721 on the mine countermeasure device 100. The buoyancy chamber 721 may be opened immediately before deployment, or on deployment.

AUV Controller

Figure 27:
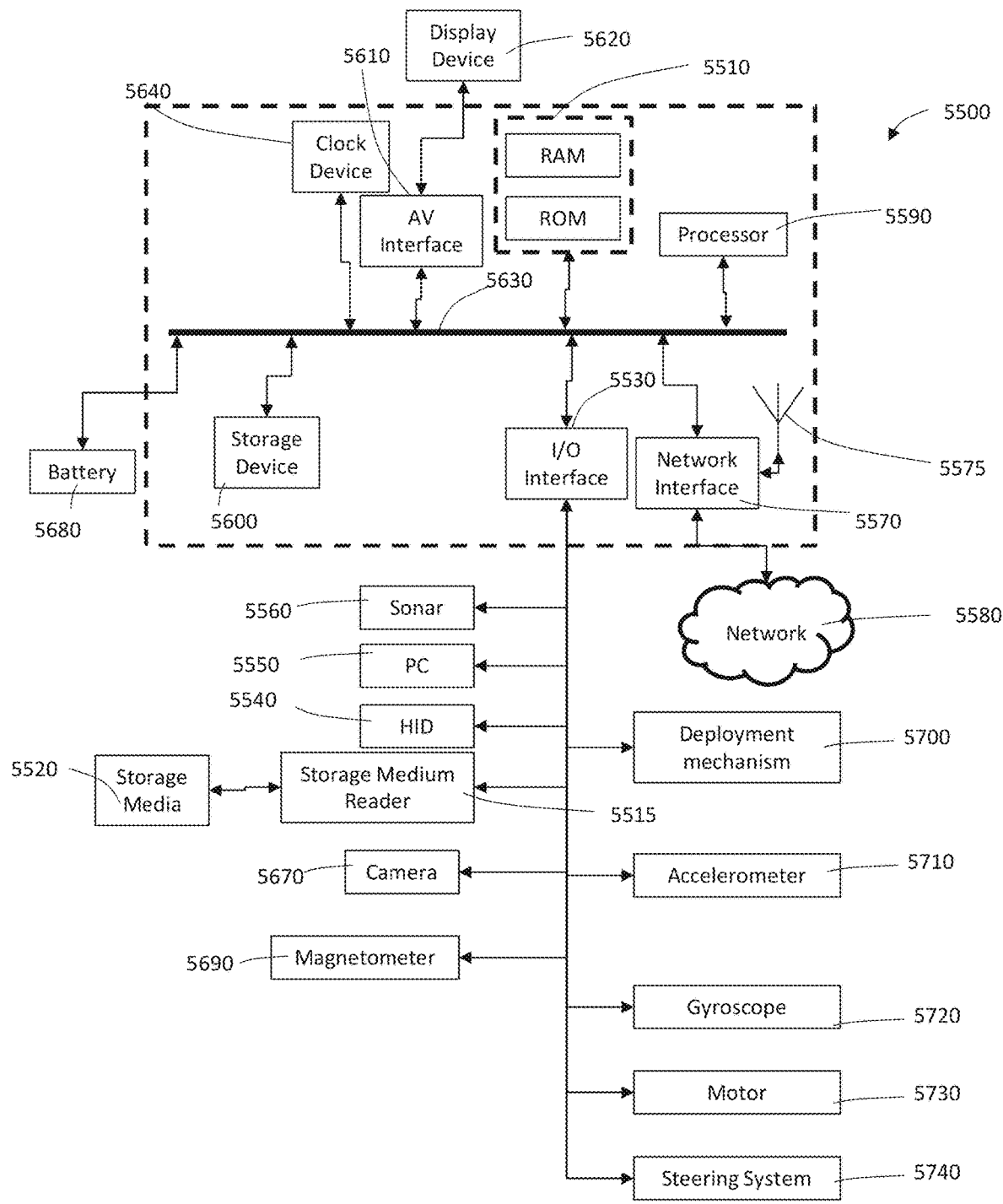
FIG. 27 shows a schematic view of an underwater transport controller.

FIG. 27 shows a computing device 5500 for use as a controller of an autonomous underwater vehicle 5000. In a preferred embodiment, the computing device 5500 takes the form of a processor mounted to a motherboard, or alternatively as a system on a chip (SoC). The controller is configured for controlling the various componentry described below that is associated with the AUV 5000.

In particular the steps of the methods of controlling the AUV, as described in further detail below, can be implemented as computer program code instructions executable by the computing device 500.

The computer program code instructions may be divided into one or more computer program code instruction libraries, such as dynamic link libraries (DLL), wherein each of the libraries performs a one or more steps of the method. Additionally, a subset of the one or more of the libraries may perform graphical user interface tasks relating to the steps of the method.

The computing device 5500 preferably comprises semiconductor memory 5510 comprising volatile memory such as random access memory (RAM) or read only memory (ROM). The memory 5510 may comprise either RAM or ROM or a combination of RAM and ROM.

The computing device 5500 comprises a computer program code storage medium reader 5515 for reading the computer program code instructions from computer program code storage media 5520. The storage media 5520 may be optical media such as CD-ROM disks, magnetic media such as floppy disks and tape cassettes or flash media such as USB memory sticks.

The device further comprises I/O interface 5530 for communicating with one or more peripheral devices. The I/O interface 5530 may offer both serial and parallel interface connectivity. For example, the I/O interface 5530 may comprise a Small Computer System Interface (SCSI), Universal Serial Bus (USB) or similar I/O interface for interfacing with the storage medium reader 515. The I/O interface 5530 may also communicate with one or more human input devices (HID) 5540 such as keyboards, pointing devices, joysticks and the like.

The I/O interface 5530 may also comprise a computer to computer interface, such as a Recommended Standard 232 (RS-232) interface, for interfacing the device 5500 with one or more personal computer (PC) devices 5550.

The controller 5500 will preferably also be configured for connection to a sonar sensor 560, with the controller being configured for receiving signals from the sonar sensor 560, and for actuating the sonar sensor.

The device 5500 also comprises a network interface 5570 for communicating with one or more networks 5580. The network 5580 is preferably an acoustic based network.

The device 5500 can also include an antenna 5575 configured for wireless communication with network 5580.

The device 5500 comprises an arithmetic logic unit or processor 5590 for performing the computer program code instructions. The processor 5590 may be a reduced instruction set computer (RISC) or complex instruction set computer (CISC) processor or the like. The computing device 5500 further comprises a storage device 5600, such as a magnetic disk hard drive or a solid state disk drive for storing data and/or software instructions.

Computer program code instructions may be loaded into the storage device 5600 from the storage media 5520 using the storage medium reader 5515 or from the network 5580 using network interface 5570. Alternatively, computer program code instructions may be loaded into the storage device 5600 from an online resource via the network 5580 and network interface 5570.

During the bootstrap phase, an operating system and one or more software applications are loaded from the storage device 5600 into the memory 5510. During the fetch-decode-execute cycle, the processor 5590 fetches computer program code instructions from memory 5510, decodes the instructions into machine code, executes the instructions and stores one or more intermediate results in memory 5510.

In this manner, the instructions stored in the memory 5510, when retrieved and executed by the processor 5590, configures the computing device 5500 as a special-purpose machine that may perform the functions described herein.

The computing device 5500 can also include an audio/video interface 5610 for conveying video signals to a display device 5620, such as a liquid crystal display (LCD), light emitting diode (LED) display, organic light emitting diode (OLED) display, cathode-ray tube (CRT) or similar display device.

The device 5500 preferably includes a communication bus subsystem 5630 for interconnecting the various devices described above. The bus subsystem 5630 may offer parallel connectivity such as Industry Standard Architecture (ISA), conventional Peripheral Component Interconnect (PCI) and the like or serial connectivity such as PCI Express (PCIe), Serial Advanced Technology Attachment (Serial ATA) and the like. The computing device 5500 can also include a clock device 5640 configured for providing accurate time stamps for use by the processor 5590.

Lastly, it is anticipated that the computing device 5500 can include a camera 5670. The camera 5670 may be connected via the I/O interface 5530 or may be built into the computing device. The camera may be configured for low-light operation, or may be configured for infrared operation.

The computing device 5500 may further be connected to a power storage device such as a battery 5680. The battery 5680 may be used to power the controller, as well as the AUV 5000.

The computing device 5500 may further be connected to a magnetometer 5690, and be configured to receive signals from the magnetometer.

The AUV may further be provided with a deployment mechanism 5700 as will be described in more detail below. The computing device 5500 will preferably be configured for connection to the deployment mechanism 5700 in order to actuate it to deploy the mine countermeasure devices 100.

Further, the AUV 5000 may be provided with an accelerometer 5710 and a gyroscope 5720 as part of the inertial navigation system. Preferably, the controller 5500 is configured for receiving signals from the accelerometer 5710 and gyroscope 5720 indicative of forces acting on the AUV 5000. The inertial navigation system is used to navigate underwater, preferably calculating the location of the AUV from signals received from the gyroscope and accelerometer, and using the location of a known point on the surface as a reference. Inertial navigation systems are known, and a discussion on the operation of the inertial navigation system is considered beyond the scope of the present specification.

The controller may also be connected to an electrical motor 5730 for powering the AUV, as well as to a steering system 5740 that allows the controller to guide movement of the AUV.

In Use—Mine Neutralising

With reference to FIG. 9, a method for disabling by neutralising an undersea mine 1000 utilising a mine neutralising device as shown in FIGS. 1 to 4, 7 and 8 100 will be described. The method is applicable to undersea mines generally, however, the examples will be directed to multi-influence bottom undersea mines 1000. The term neutralising is generally used in the specification to mean the detonation of the undersea mine.

Now described with reference to FIG. 9, initially it is envisaged that the mine neutralising device 100 will be positioned 4 within a predetermined distance of the undersea mine 1000. Typically, the mine neutralising device 100 is positioned as close as possible to the mine, and preferably within at least 2 to 3 metres.

As shown in FIG. 1, the mine neutralising device 100 is adapted to generate one or more synthetic signals 2000 which emulate vessel signals 4000 emitted by a vessel 3000. The one or more synthetic signals 2000 are generated in close proximity to the undersea mine 1000. The mine neutralising device 1000 will then detect the bearing and range of the undersea mine from the transducer.

In one embodiment of the mine neutralising device 100, a hydrophone array (not shown) and flexural disc transducer 102 is used to detect the range and bearing of the mine neutralising device 100 with respect to the undersea mine 1000. This is achieved by transmitting 6 broadband pulses from the flexural disc transducer 102, after which reflected pulses are received 8 by the hydrophone array.

The processor then processes the reflected pulses received by the hydrophone array in order to determine 10 the range and bearing of the undersea mine 1000 in relation to the mine neutralising device 100.

It is further envisaged that the mine neutralising device can take into account pressure fluctuations caused by swell on the surface that may assist it in neutralising the undersea mine 1000. This is because some undersea mines take into account pressure fluctuations caused by vessels in determining whether to detonate.

As may be seen in FIG. 9, the mine neutralising device 100 will receive 12 a pressure fluctuation signal from one of the pressure transducers. The processor then processes the pressure fluctuations signal to determine the period and/or frequency of the pressure fluctuations caused by swell at the surface, and determines 14 the required signal strength and timing of transmitting of a synthetic signal that will be required to fool the undersea mine 1000 into believing that a target vessel is in range. Preferably the generation of the synthetic signal will be timed to coincide with a time range of low pressure caused by the swells at the surface.

Once the strength and timing of the synthetic signal has been determined 14, the synthetic signal is generated 16 by the various signal generators, including the flexural disc, coil arrangement and/or seismic transducer within the proximity of the mine to cause it to detonate.

It is also envisaged that an alternative embodiment the mine neutralising device 100 may not transmit broadband pulses in order to receive a reflected pulse. Instead, an ambient sound signal may be received by the hydrophone array, together with reflected ambient sound signal that has been reflected off the undersea mine, and the bearing and range of the undersea mine may be detected from processing of these received signals.

It is also envisaged that, in order to more closely synthesise the signals of a target vessel, the mine neutralising device 100 may receive a vessel signal 4000 from an approaching target vessel 3000, such as a submarine or ship.

The processor will then cause the vessel signal 4000 to be amplified, before generating the amplified vessel signal in the close proximity of the undersea mine 1000. It is further envisaged that the vessel signal 4000 could be recorded in order to allow for amplification and/or transmitting of data relating to the vessel signal for information purposes.

In this way, it is envisaged that a more accurate synthesising of the vessel signal may be provided, while ensuring that the undersea mine 1000 is detonated before the target vessel is within a range that would cause damage to the target vessel if the undersea mine is detonated.

It will be appreciated by a person skilled in the art, that the larger the distance from the undersea mine 1000, the more energy will be required to generate a synthetic signal 2000 of sufficient energy to trigger the undersea mine 1000, making the correct distance from the mine 1000 an important factor when positioning the mine neutralising device 100.

The positioning of the mine neutralising device 100 may be achieved through a number of different means with the use of Autonomous Underwater Vehicles (AUVs) being preferable. One example of an AUV being the Bluefin 21, which is presently in use by the US Navy. Other methods for delivering the mine neutralising device 100 may include the use of divers, low altitude air drops from autonomous aircraft, surface deployment from Unmanned Surface Vehicles (USVs) among other methods. In one embodiment (not shown) it is envisaged that the mine neutralising device 100 can include its own drive and/or positioning system.

Vessel signals 4000 that undersea mines may respond to may include any one of:
 a. an acoustic signature of a vessel;
 b. a magnetic signature of a vessel;
 c. a seismic signature of a vessel; or
 d. an electric field signature of a vessel.

Further, some undersea mines are sensitive to pressure, which is reduced when a ship passes overhead (by virtue of Bernoulli's principle).

The nature of the above vessel signals 4000 are those that would be produced by a vessel 3000 under its usual operating conditions and hence would be the likely signals that a mine would be adapted to trigger on.

Further, it is envisaged that a pressure sensor will be utilised by the mine neutralising device 100 in order to time the generation of acoustic and magnetic signatures with the onset of low pressures during sea surface swell. By timing the generation of magnetic and acoustic signatures to match periods of low pressure caused by swell, it is anticipated that the chances of actuating a pressure sensitive mine can be increased.

It will be appreciated that as mines become more sophisticated it is likely that the mines may sense and/or monitor a plurality of signals 4000, which they may rely on for actuation of the mine. Similarly, the mine neutralising device 100 may be required to emit a plurality of synthetic signals 2000, in order to emulate vessel signals 4000 to activate the mine 1000.

Figure 4A:
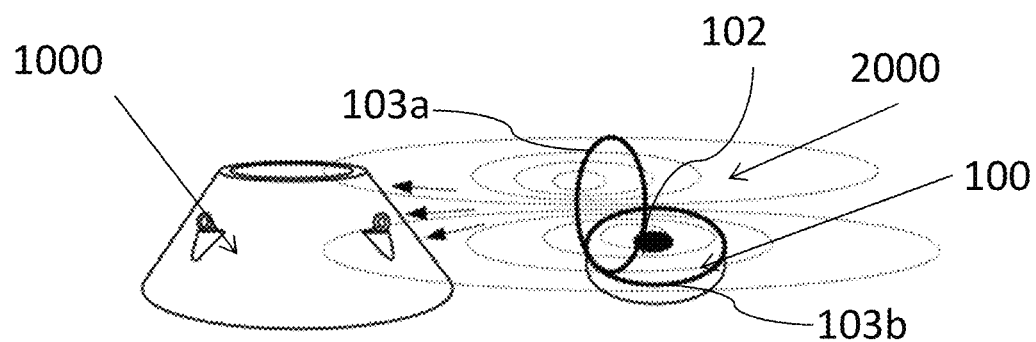
FIG. 4a shows a top perspective view of a mine jamming/neutralising device in proximity to an undersea bottom mine.
Figure 4B:
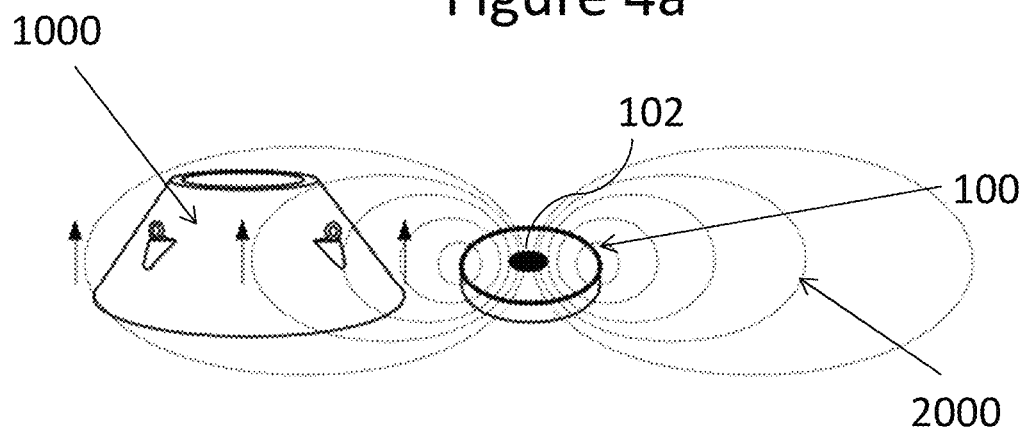
FIG. 4b shows a top perspective view of a second embodiment of a mine jamming/neutralising device in proximity to an undersea bottom mine.
Figure 4C:
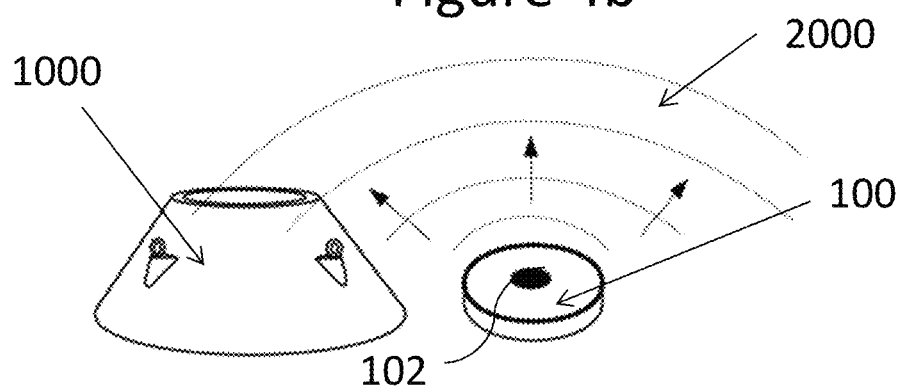
FIG. 4c shows a top perspective view of a second embodiment of a mine jamming/neutralising device in proximity to an undersea bottom mine.

With reference to FIG. 4c, the generation of an acoustic signature in the vicinity of the mine 1000 is exemplified where a sound generating device such as a flexural disc transducer 102 is used to generate an acoustic signature within the vicinity of the mine 1000.

With reference to FIGS. 4a and 4b, the generation of a synthetic signal 2000 in the form of a magnetic signature is exemplified in two planes. The magnetic signature is generated by passing controlled current through a pair of coils 103 oriented in the vertical and horizontal planes. As magnetic fields are vector quantities, the use of two coils 103a, 103b oriented in different planes allows for the precise generation of the magnetic field in proximity of the mine 1000. Preferably, and as shown in FIG. 4a, the vertically oriented coil 103a is adapted to extend upwards once the mine neutralising device 100 has been positioned. The vertically oriented coil 103a is preferably configured to be reconfigured, preferably by pivoting movement, from a horizontally aligned position to the vertically aligned position once the mine neutralising device 100 has been positioned. The reconfiguration of the vertically oriented coil 103a after the neutralising device 100 has been positioned on the sea floor allows it to be stacked during transit in an AUV as one example. In an alternative embodiment (not shown), it is envisaged that magnetic fields may be generated in 3 or more planes.

The generation of one or more synthetic signals 2000 in close proximity to the mine 1000 provides a novel means of generating relatively low power signals that are sufficient to activate the undersea mine 1000. It will be appreciated by a person skilled in the art that, as magnetic fields reduce in intensity in cubed proportion to the distance from the source (as $1/r^3$) and electric fields reduce in intensity in squared proportion to the distance from the source (as $1/r^2$), large amounts of energy are required in order to activate the mine 1000 from an appreciable distance by the generation of synthetic signals 2000.

In order to generate the synthetic signals 2000, a selection of transducers are actuated, with preferably a separate transducer being used to generate the acoustic wave and seismic waves. Magnetic fields may be generated using the coils 103 as discussed above. Electrical fields may be generated using electrodes (not shown) as discussed above.

For generating the acoustic signals, a transducer which is capable of generating low frequency acoustic energy with high acoustic source levels is required. Flexural disc transducers satisfy these requirements. Flexural disc transducers are known, and examples of these can be found in U.S. Pat. No. 4,709,361 and in U.S. Pat. No. 3,382,841. One example is the SonoFlex 850 HP flexural disc transducer which is produced by Chelsea Technologies. In the embodiment shown, the flexural disc transducer 102 is positioned at the centre of the mine neutralising device 100 providing effectively an omni-directional sound source in the vicinity of the mine neutralising device 100.

In order to generate the magnetic field, a coil arrangement including one or more coils is used, which in one embodiment may consist of around 400 turns of AWG 18 enameled copper wire. In an alternative embodiment (not shown) any number of turns of wire may be used, and any suitable wire may be used. Preferably, the coils will be immersed in sea water in use, providing cooling to the coils. The coils will be supplied at around 2 Amperes of current using coil drivers which may consist of a switch-mode programmable power supply. Current control will be achieved through the switch-mode power supply.

Power storage for the power supply is preferably by use of batteries, however alternative embodiments envisaged the use of alternative power storage such as super capacitors or the like.

It is envisaged that at least two coils will be used in order to generate a magnetic field in at least the vertical and horizontal planes. As was previously discussed, magnetic fields are vector quantities and in order to achieve fields mimicking a vessel, the magnitude and direction components of the field need to be controlled which may be achieved using magnetic coil positioned in multiple planes with the vector addition resulting in the emulated field.

Typically, multi-influence mines 'wake up' on an acoustic channel, where the mine 1000 enters a wake mode when it senses an acoustic signal representative of a target vessel 3000. Typically, once the mine 1000 has entered the wake mode, it will then sense another parameter such as a magnetic signature and/or pressure differential to confirm the presence of the target vessel 3000. It would be typically at this point that the mine 1000 would be caused to detonate.

Figure 10:
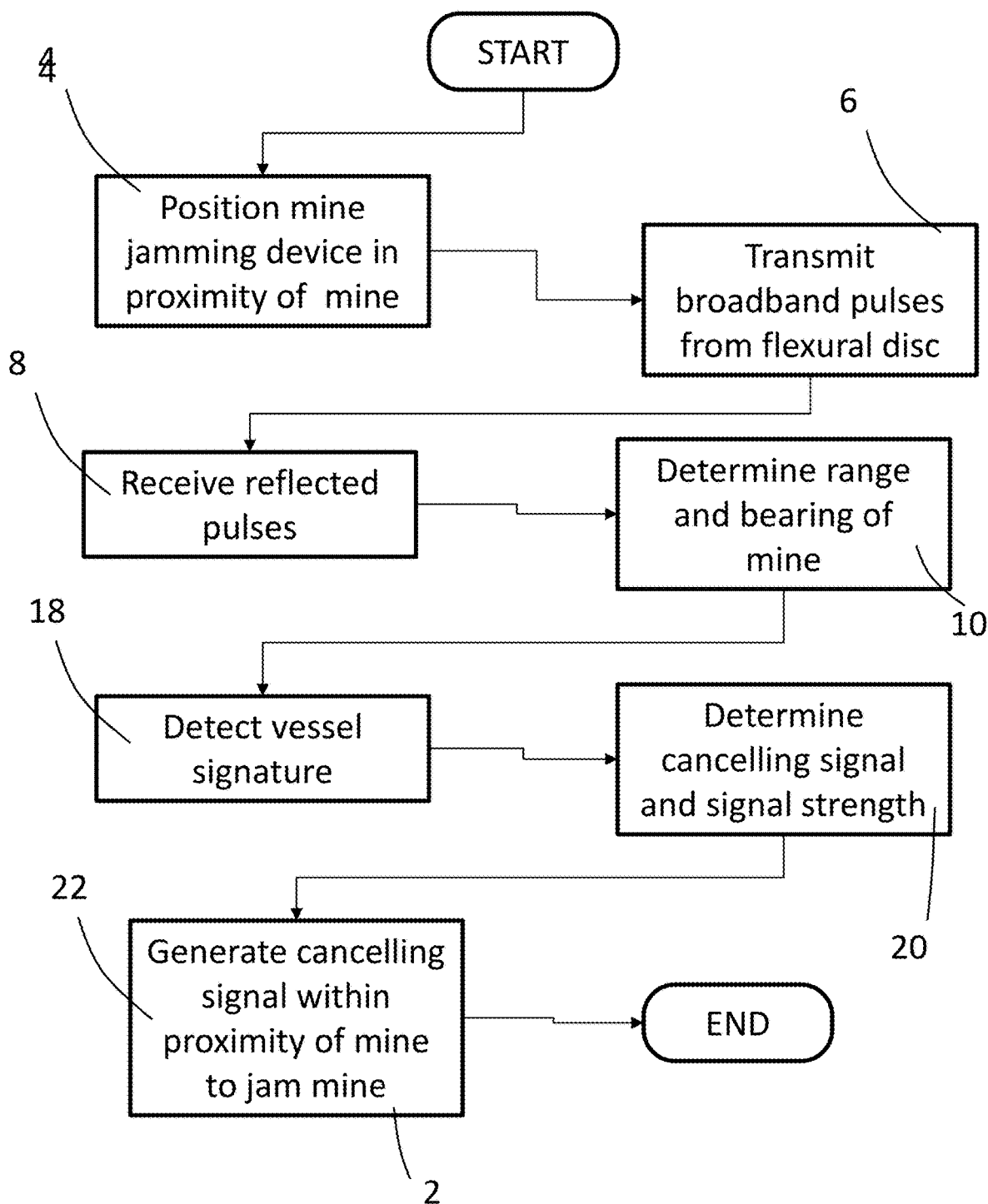
FIG. 10 shows a flowchart exemplifying a method of disabling an undersea mine.
Figure 11:
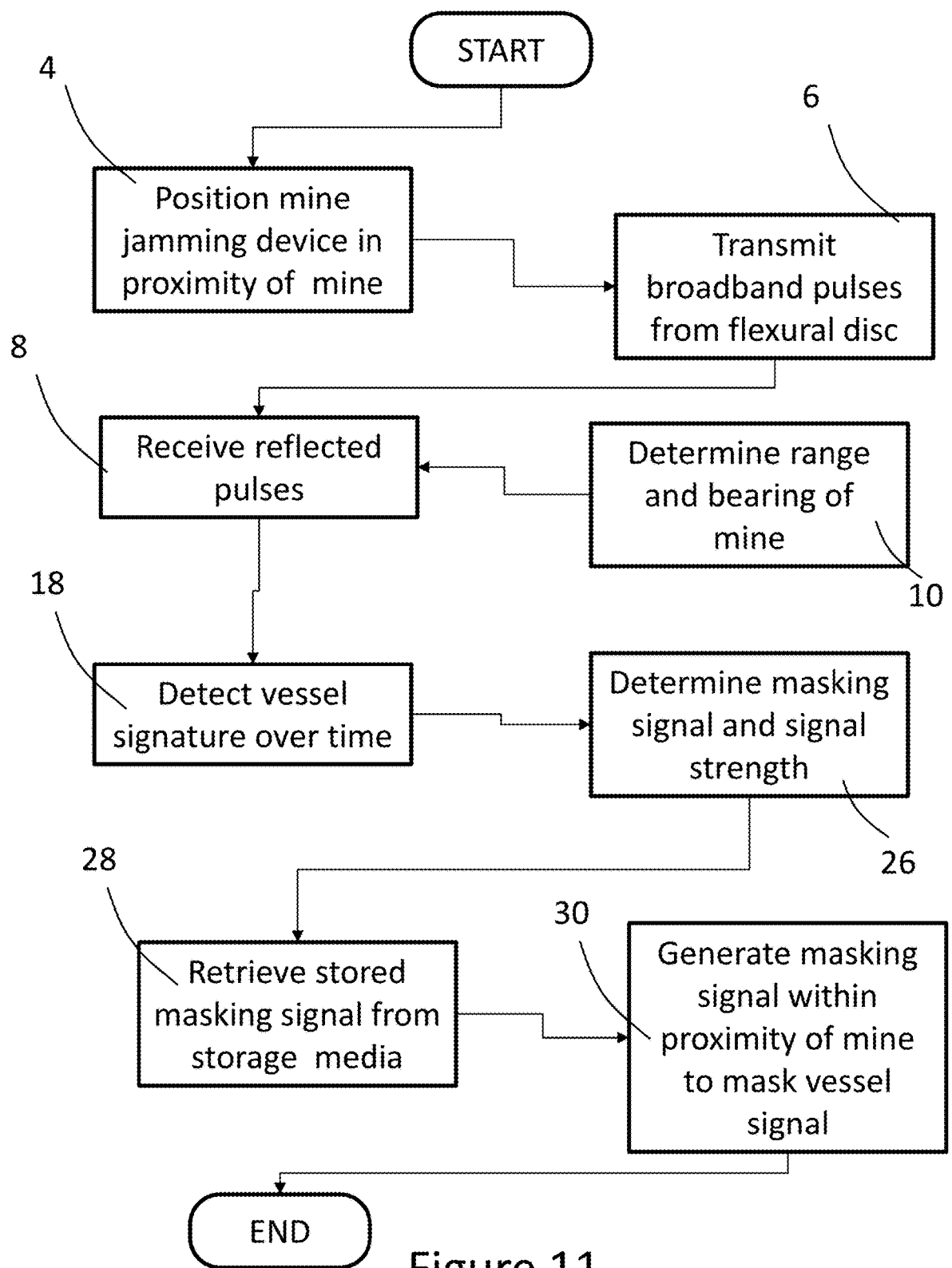
FIG. 11 shows a flowchart exemplifying a method of disabling an undersea mine.

In Use-Mine Jamming/Cancelling/Masking Method as mentioned previously, another strategy in dealing with undersea mines 1000 in accordance with the present invention, and with reference to FIGS. 10-11, is the technique of jamming, in which the undersea mine 1000 is prevented from detonation. The disabling by jamming of an undersea mine may be carried out by effectively masking, attenuating or suppressing vessel signals 4000 that would typically cause the undersea mine 1000 to detonate. These signals 4000 are those that are typically generated by the passage of a vessel 3000 in the proximity of the undersea mine.

In a first method of jamming described with reference to FIG. 10 the mitigation of vessel signals 4000 is achieved by cancelling the signals generated by the vessel 3000 which would otherwise result in the detonation of the undersea mine 1000, and leading to the potential destruction of the vessel 3000.

The initial steps of the method described in FIG. 10 are similar to that as described in FIG. 9, wherein the mine neutralising device is positioned 4 in the proximity of the undersea mine 1000, and the range and bearing of the undersea mine 1000 is detected 6 by transmitting broadband pulses from the flexural disc, receiving 8 the reflected pulses from the undersea mine, and processing the reflected pulses to determine 10 the range and bearing of the mine. Alternatively, the range and bearing of the undersea mine 1000 may be received from an underwater transport vehicle as will be described in more detail below.

In this method, the range and bearing of the mine becomes more important as the cancelling signal must be calculated by the processor to ensure that the cancelling signal is of the right frequency and amplitude to cancel the vessel signal 4000 at the mine, and not at the hydrophone array.

Once the range and bearing of the undersea mine 1000 has been detected, the mine jamming device 100 detects 18 a vessel signal 4000 received from a vessel such as a ship or submarine, typically in the form of an acoustic signature, as well as in the form of a magnetic field signature. The processor is then used to process the vessel signal 4000 to determine 20 a cancelling signal, wherein the cancelling signal is adapted to attenuate the acoustic signature and the magnetic field signature at the undersea mine 1000, taking into account loss of power/intensity over the distance between the mine jamming device 100 and the mine 1000. In particular, it is envisaged that the coils will be controlled to generate the required amount of magnetic flux at the particular location of the magnetic field sensor of the mine 1000.

The determined cancelling signal is then generated 22. It is envisaged that the cancelling signal will include an acoustic component generated by the flexural disc transducer 102, as well as a magnetic field component generated by the coils, but could also include additional seismic components. In this way, the cancelling signal, when it reaches the undersea mine 1000 will attenuate the vessel signature 4000 (in both the acoustic and magnetic field form) that is received by the undersea mine 1000.

The mine jamming device 100 is adapted for carrying out the above method in close proximity to the undersea mine 1000 and typically within 2 to 3 metres of the undersea mine 1000.

In one embodiment of the mine jamming device 100, a hydrophone array (not shown) and a low-frequency transducer in the form of a flexural disc transducer 102 is provided, the combination of which is used to precisely determine the orientation of the mine jamming device 100 with respect to the undersea mine 1000. This is achieved by transmitting broadband pulses from the flexural disc transducer which are received by the hydrophone array in order to ascertain the range and bearing of the undersea mine 1000 in relation to the mine jamming device 100. Based on the distance from the undersea mine 1000, the mine jamming device 100 may determine the strength of the cancelling signals 2000 which need to be generated.

In another embodiment, and with reference to FIG. 11, a method of masking the presence of a vessel 3000 is provided. This method will be carried out on a mine jamming device 1000 as described above.

The initial steps are similar in that the mine jamming device 100 will be positioned in the proximity of the mine, and the range and bearing of the mine will be detected by transmitting broadband pulses from the flexural disc 102, receiving 8 the reflected pulses from the undersea mine, and determining 10 the range and bearing of the mine. Further, the mine jamming device will then detect 24 the vessel signals 4000 received from a nearby vessel such as a ship or submarine. The vessel signals may be in the form of an acoustic signal and/or magnetic field signal. The software is configured for directing the processor to determine the rate of increase of intensity of the vessel signature-based on how quickly the vessel signature increases in amplitude from when it is initially detected. In this way, the mine jamming device 100 will be able to tell if the approaching vessel will move into targeting range of the undersea mine 1000, or whether it will skirt the targeting range. In this regard, the vessel signature (preferably acoustic) of a wide variety of ship classes at different ranges may be stored on the digital storage media, and the software may be configured for directing the processor to compare the received vessel signal to stored vessel signatures to establish what the intensity of the signals of the vessel would be when it is in the targeting range of the mine. In this way, the rate of increase of intensity of the vessel signal could be compared to vessel signatures at different ranges in order to determine the speed and bearing of the vessel, and hence predetermine whether the vessel would be moving into the targeting area of the mine. Additional techniques to determine vessel speeds and headings could be used, for example using the Doppler effect, to determine whether the vessel would move into the targeting area of the mine. All of this information can be used to determine 26 the nature and strength of the masking signal to be generated, taking into account the loss in signal between the mine jamming device 100 and the undersea mine 1000.

The mine jamming device 100 will then preferably retrieve 28 a stored masking signal from storage media. If the expected intensity of the vessel signal when it moves to within the targeting area of the undersea mine 1000 can be predetermined, then a suitable masking signal can be selected from a variety of masking signals. However, the expected intensity of the vessel signal need not be predicted, and instead a masking signal of a predetermined intensity may be used until the vessel signals are no longer detected, or after a predetermined time period has passed. Examples of masking signals could include a white noise type signal, or a signal mimicking a storm at sea, or any other suitable masking signal.

The stored masking signal will then be generated 30, preferably by the flexural disc transducer 102 and in the coils 103 to provide an acoustic component and a magnetic field component, and possibly including a seismic component, within the proximity of the mine in order to mask the vessel signal.

The masking signal will preferably include a broad band acoustic component at a frequency of between 10 Hz and 5 kHz, and could also include a narrow band acoustic component is generated at a plurality of discrete frequencies within this frequency range. The magnetic field masking signal will be generated by the coils 103 preferably at the location of the magnetic field sensors of the undersea mine.

The masking signal could also include a pressure component, an electrical field component and/or a seismic component.

Preferably, the masking signal is generated at an intensity configured to overwhelm and/or confuse sensors on the undersea mine, to thereby mask the presence of a vessel.

Clearly, the mine jamming device 100 could produce a jamming signal permanently in order to negate the undersea mine 1000. However, this would result in an increased battery usage of the mine jamming device 100, and result in a shorter period during which the undersea mine 1000 is jammed. In this way, the masking signal is only generated when an approaching vessel is determined to be at risk and within the undersea mine's 1000 targeting range.

The intention is to overload or overwhelm the undersea mines 1000 acoustic channel with spurious signals to mask the signatures of target vessels. In one example, the broadband acoustic signal would mimic rough sea conditions, or a storm at the surface, to thereby drown out or mask the acoustic and/or seismic and/or magnetic and/or electrical energy emitted by a vessel 3000.

In another example, white noise may be generated for masking the acoustic signal 4000 from a vessel 3000. As mentioned previously, the masking signal may be generated parametrically or from a file stored in the memory of the mine jamming device 100.

There are a limited number of transducers which can effectively generate sufficient broad band acoustic energy underwater, with the flexural disc transducer 102 being one such transducer. Flexural disc transducers can provide high power and low frequency sound sources within the ranges of interest for emulating shipping. One example of such a transducer is the Chelsea Technologies SonoFlex 850 HP transducer, although a large number of alternative transducers may be also be capable of generating the signals described above.

An advantage of targeting the acoustic channel of a mine 1000 is that many undersea mines are configured to wake up by sensing activity on an acoustic channel, where the mine 1000 will wake when it detects an acoustic signal which is representative of a target vessel 3000. The present invention provides a device which when positioned in close proximity to the undersea mine 1000 produces a "zone of relative quiet" within the vicinity of the mine and hence can prevent the mine 1000 from waking up.

Methods of adaptive acoustic noise cancellation utilising Digital Signal Processing (DSP) as are known in the art, may be employed where in one embodiment, a hydrophone is used to detect acoustic signatures around the undersea mine 1000. The acoustic signals detected by the hydrophone are then processed to generate a cancelling signal (anti-phase), which is generated in proximity of the mine 1000 to attenuate the acoustic signature. Using these techniques sound attenuation at least in the order of 20 dB is achievable.

The anti-phase acoustic signal when added to the signal generated by the vessel 3000 will attenuate any acoustic noise within the vicinity of the mine, thereby causing a "sphere of relative quiet" in the vicinity of the mine and preventing the undersea mine 1000 from waking up and detonating.

In a similar fashion to the positioning of the mine neutralising device 100, the positioning of the mine jamming device 100 may be achieved through a number of different means with the use of Autonomous Underwater Vehicles (AUVs) being preferable. One example AUV being the Bluefin 21, which is presently in use, by the US Navy. Other methods for delivering the mine jamming device 100 may include the use of divers, low altitude air drops from autonomous aircraft, surface deployment from USV's among other methods.

Functionality—Autonomous Underwater Vehicle

Now described below, the functionality of an autonomous underwater vehicle will now be described below with reference to FIGS. 21, 25, 26 and 28.

Figure 28:
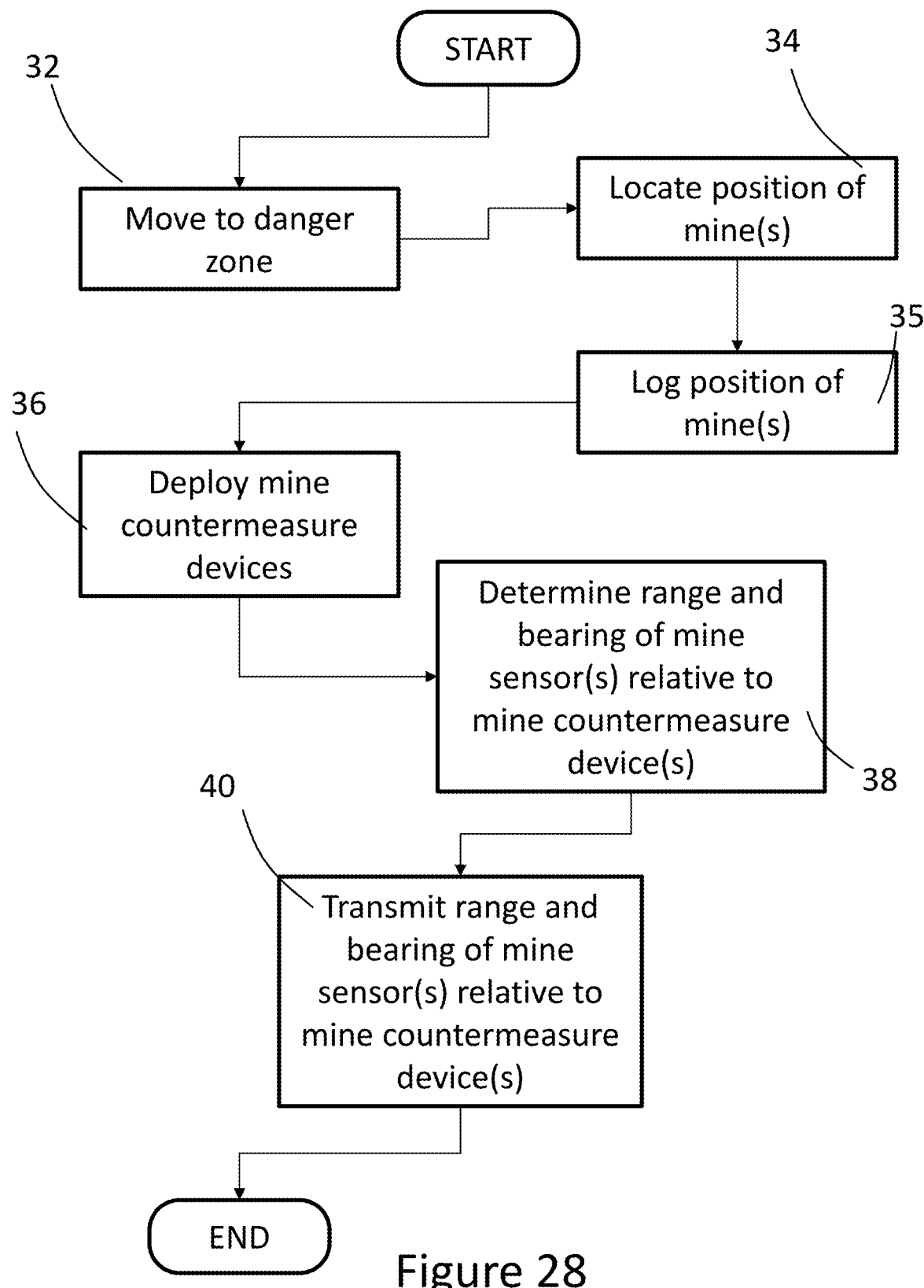
FIG. 28 shows a flow chart of a method of deploying a mine countermeasure device.

With reference to FIG. 28, it is envisaged that the autonomous underwater vehicle 5000 will initially be deployed from a ship, or alternatively from a helicopter or other aircraft. The controller of the AUV will preferably already have the location of a danger zone pre-input into the AUV guidance system. The danger zone is the area in which undersea mines have been detected, will preferably include the actual location of a detected mine. The controller will then guide the AUV to move 32 into the danger zone, and more specifically to a particular mine that has been detected. Once in the danger zone, it is envisaged that the controller may guide the AUV 5000 to carry out a sweep of the danger zone to locate 34 the position of undersea mines. The location of undersea mines in the danger zone may also be pre-input where, for example they have been located previously by divers. Alternatively, the AUV may be configured to carry out a sweep of a predetermined surface area around the location where an undersea mine has been detected.

Figure 21:
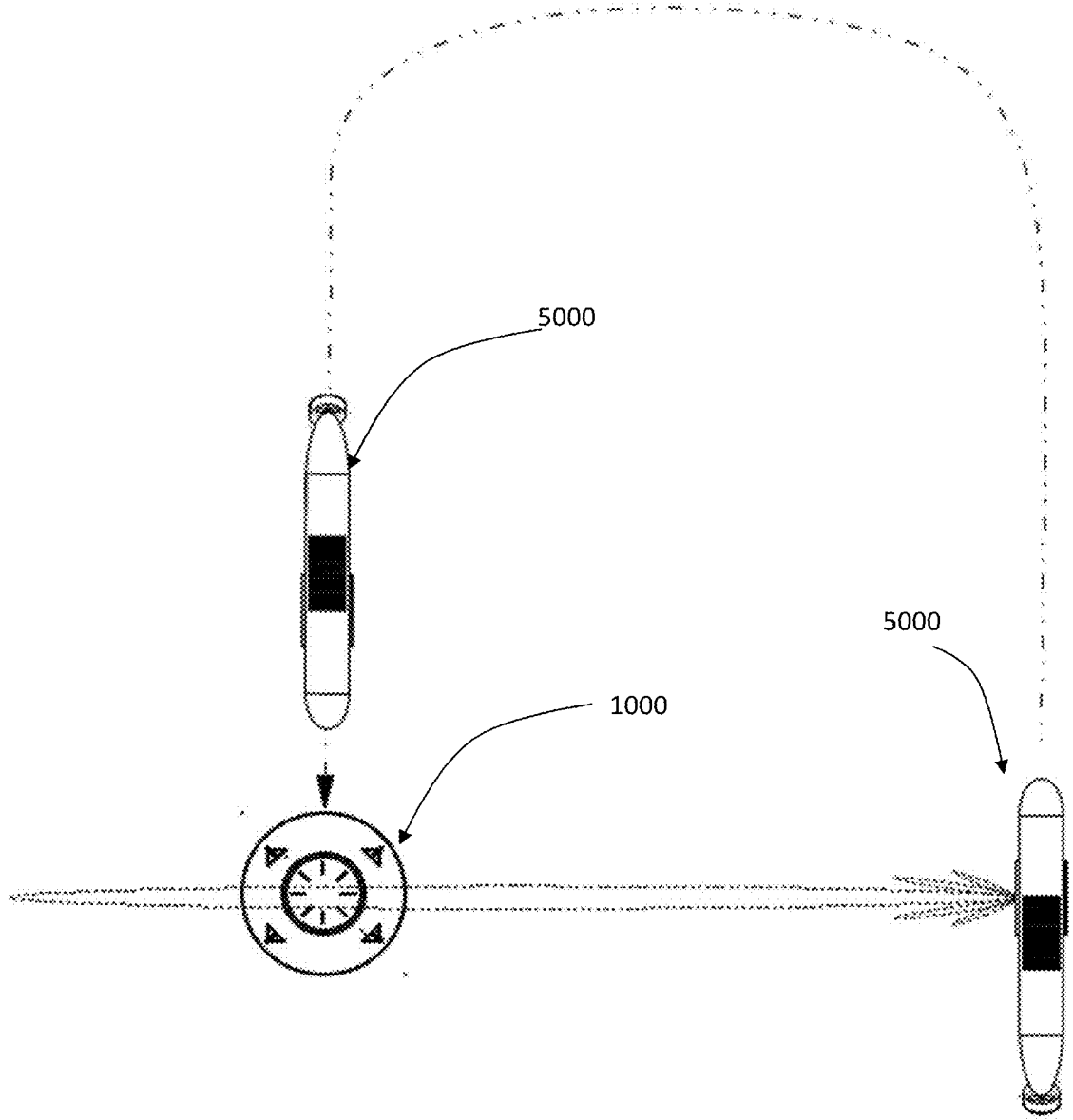
FIG. 21 shows a top view of an underwater transport scanning for undersea mines.

In carrying out the sweep, and as shown in FIG. 21, the AUV will utilise its sensors, and particularly the camera 5670, magnetometer 5690, and sonar 5560 in order to detect the presence of undersea mines, and preferably identifying the type and/or make and/or nature of the undersea mine, as well as its exact location using the inertial guidance system. On detecting undersea mines, the location of the undersea mines, will be logged 35 and stored, together with any information determined about the mine. It is envisaged that the controller of the AUV 5000 may be configured for identifying particular mine types from signals received from its sensors.

The controller will then guide the AUV 5000 on a deployment run, in which at least one or more mine countermeasure devices 100 are deployed 36 at a distance preferably within 2 m of each detected undersea mine.

After deployment of the mine countermeasure devices 100, the AUV 5000 will preferably carry out a further sweep of the detected mines and deployed mine countermeasure devices in order to determine 38 the range and bearing of the undersea mine, and preferably particular sensors on the undersea mine, relative to the mine countermeasure devices.

The range and bearing of the mine sensors relative to the mine countermeasure devices will then be transmitted 42 the mine countermeasure device.

As mentioned previously, the mine countermeasure devices may be configured for carrying out such a determination of the range and bearing of the mine sensors relative to the mine countermeasure device itself. This is exemplified in FIGS. 25 and 26, where the mine countermeasure device 100 sends out a preferably acoustic pulse from its acoustic transducer 102, and uses the hydrophone is to detect the reflected acoustic pulse.

Once the mine countermeasure device 100 has information on the range and bearing of the sensors of the undersea mine 1000, the mine countermeasure device 100 will then generate a time dependent synthetic signal based on the physics-based mathematical model described above. In generating the time dependent synthetic signal, the mine countermeasure device will utilise at least two, and preferably three coils in order to be able to ensure that the magnetic flux of a magnetic field generated at the magnetic field sensors of the mine is strong enough and accurate enough to mimic a target vessel signature. In addition, the flexural disk transducer will be utilised to provide acoustic signals to be received by acoustic sensors on the undersea mine.

By utilising two, and preferably three coils to generate a magnetic flux at the magnetic sensor is of the undersea mine, it is anticipated by the applicant that a lower amount of power may be used to provide a stronger magnetic field at the exact location of the mines magnetic field sensors, and that the magnetic field being generated will more closely mimic those of a target vessel.

It is further envisaged that where the deployment of the mine countermeasure device 100 is not resulted in the mine countermeasure device being within a two meter range of the undersea mine 1000, the AUV 5000 may deploy an additional mine countermeasure device 100. If that mine countermeasure device 100 is also not within a two meter range, it is envisaged that the two mine countermeasure devices deployed around a single mine may cooperate together to generate a sufficiently strong magnetic field at the location of the magnetic field sensor of the undersea mine. In this regard, the controller of the mine countermeasure devices may be configured for communication with each other in order to synchronise acoustic and/or magnetic fields being generated and which were being received by the undersea mine.

Interpretation

Jamming

In the context of the invention, the term "jamming" and similar terms refers to methods put in place to prevent a mine from triggering and hence detonating.

Neutralising

In the context of the invention, the term "neutralising" and similar terms refers to the self destruction of a mine through actuation.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein. For the purposes of the present invention, additional terms are defined below. Furthermore, all definitions, as defined and used herein, should be understood to control over dictionary definitions, definitions in documents incorporated by reference, and/or ordinary meanings of the defined terms unless there is doubt as to the meaning of a particular term, in which case the common dictionary definition and/or common usage of the term will prevail.

The terminology used herein is for the purpose of describing particular embodiments only and is not intended to be limiting of the invention. As used herein, the singular articles "a", "an" and "the" are intended to include the plural forms as well, unless the context clearly indicates otherwise and thus are used herein to refer to one or to more than one (i.e. to "at least one") of the grammatical object of the article. By way of example, the phrase "an element" refers to one element or more than one element.

The term "about" is used herein to refer to quantities that vary by as much as 30%, preferably by as much as 20%, and more preferably by as much as 10% to a reference quantity. The use of the word 'about' to qualify a number is merely an express indication that the number is not to be construed as a precise value.

Throughout this specification, unless the context requires otherwise, the words "comprise", "comprises" and "comprising" will be understood to imply the inclusion of a stated step or element or group of steps or elements but not the exclusion of any other step or element or group of steps or elements.

The term "real-time" for example "displaying real-time data," refers to the display of the data without intentional delay, given the processing limitations of the system and the time required to accurately measure the data.

As used herein, the term "exemplary" is used in the sense of providing examples, as opposed to indicating quality. That is, an "exemplary embodiment" is an embodiment provided as an example, as opposed to necessarily being an embodiment of exemplary quality for example serving as a desirable model or representing the best of its kind.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the context of this document, the term "bus" and its derivatives, while being described in a preferred embodiment as being a communication bus subsystem for interconnecting various devices including by way of parallel connectivity such as Industry Standard Architecture (ISA), conventional Peripheral Component Interconnect (PCI) and the like or serial connectivity such as PCI Express (PCIe), Serial Advanced Technology Attachment (Serial ATA) and the like, should be construed broadly herein as any system for communicating data.

in Accordance with:

As described herein, 'in accordance with' may also mean 'as a function of' and is not necessarily limited to the integers specified in relation thereto.

Composite Items

As described herein, 'a computer implemented method' should not necessarily be inferred as being performed by a single computing device such that the steps of the method may be performed by more than one cooperating computing devices.

Similarly objects as used herein such as 'web server', 'server', 'client computing device', 'computer readable medium' and the like should not necessarily be construed as being a single object, and may be implemented as a two or more objects in cooperation, such as, for example, a web server being construed as two or more web servers in a server farm cooperating to achieve a desired goal or a computer readable medium being distributed in a composite manner, such as program code being provided on a compact disk activatable by a license key downloadable from a computer network.

Database:

In the context of this document, the term "database" and its derivatives may be used to describe a single database, a set of databases, a system of databases or the like. The system of databases may comprise a set of databases wherein the set of databases may be stored on a single implementation or span across multiple implementations. The term "database" is also not limited to refer to a certain database format rather may refer to any database format. For example, database formats may include MySQL, MySQLi, XML or the like.

Wireless:

The invention may be embodied using devices conforming to other network standards and for other applications, including, for example other WLAN standards and other wireless standards. Applications that can be accommodated include IEEE 802.11 wireless LANs and links, and wireless Ethernet.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. In the context of this document, the term "wired" and its derivatives may be used to describe circuits, devices, systems, methods, techniques, communications channels, etc., that may communicate data through the use of modulated electromagnetic radiation through a solid medium. The term does not imply that the associated devices are coupled by electrically conductive wires.

Processes:

Unless specifically stated otherwise, as apparent from the following discussions, it is appreciated that throughout the specification discussions utilizing terms such as "processing", "computing", "calculating", "determining", "analysing" or the like, refer to the action and/or processes of a computer or computing system, or similar electronic computing device, that manipulate and/or transform data represented as physical, such as electronic, quantities into other data similarly represented as physical quantities.

Processor:

In a similar manner, the term "processor" may refer to any device or portion of a device that processes electronic data, e.g., from registers and/or memory to transform that electronic data into other electronic data that, e.g., may be stored in registers and/or memory. A "computer" or a "computing device" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. The processing system further may include a memory subsystem including main RAM and/or a static RAM, and/or ROM.

Computer-Readable Medium:

Furthermore, a computer-readable carrier medium may form, or be included in a computer program product. A computer program product can be stored on a computer usable carrier medium, the computer program product comprising a computer readable program means for causing a processor to perform a method as described herein.

Networked or Multiple Processors:

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

ADDITIONAL EMBODIMENTS

Thus, one embodiment of each of the methods described herein is in the form of a computer-readable carrier medium carrying a set of instructions, e.g., a computer program that are for execution on one or more processors. Thus, as will be appreciated by those skilled in the art, embodiments of the present invention may be embodied as a method, an apparatus such as a special purpose apparatus, an apparatus such as a data processing system, or a computer-readable carrier medium. The computer-readable carrier medium carries computer readable code including a set of instructions that when executed on one or more processors cause a processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

Carrier Medium:

The software may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media.

Implementation:

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Means for Carrying Out a Method or Function

Furthermore, some of the embodiments are described herein as a method or combination of elements of a method that can be implemented by a processor of a processor device, computer system, or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

Connected

Similarly, it is to be noticed that the term connected, when used in the claims, should not be interpreted as being limitative to direct connections only. Thus, the scope of the expression a device A connected to a device B should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still co-operate or interact with each other.

EMBODIMENTS

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

Chronological Order

For the purpose of this specification, where method steps are described in sequence, the sequence does not necessarily mean that the steps are to be carried out in chronological order in that sequence, unless there is no other logical manner of interpreting the sequence.

Markush Groups

In addition, where features or aspects of the invention are described in terms of Markush groups, those skilled in the art will recognise that the invention is also thereby described in terms of any individual member or subgroup of members of the Markush group.

INDUSTRIAL APPLICABILITY

It is apparent from the above, that the arrangements described are applicable to the defence industries.

What is claimed is:

1. An autonomous underwater transport for deploying mine countermeasure devices including:
   a. a prime mover;
   b. a hull including an internal cargo bay for holding one or more mine neutralising devices within the cargo bay; and
   c. a device deployment system including an ejection mechanism configured for autonomously ejecting the one or more mine countermeasure devices from the cargo bay,
   wherein the one or more mine countermeasure devices are ejected by the ejection mechanism with a rearward velocity component from the cargo bay.

2. The autonomous underwater transport according to claim 1, wherein the underwater transport includes a navigation system.

3. The autonomous underwater transport according to claim 1, wherein the underwater transport includes a controller configured for:
   a. receiving a signal indicative of a location of an identified undersea mine;
   b. autonomously controlling movement of the transport to approach an identified undersea mine; and
   c. deploying one or more mine countermeasure devices in the close proximity of the one or more undersea mines.

4. The autonomous underwater transport according to claim 3, wherein the underwater transport includes one or more sensors configured for identifying undersea mines.

5. The autonomous underwater transport according to claim 4, wherein the signal indicative of the location of an identified undersea mine is received from the one or more sensors.

6. The autonomous underwater transport according to claim 3, wherein the controller is configured for receiving a signal identifying one or more sensors on the one or more undersea mines with respect to the one or more mine countermeasure devices.

7. The autonomous underwater transport according to claim 3, wherein the controller is configured for detecting a range and bearing of one or more sensors on the one or more undersea mines with respect to the deployed mine countermeasure devices.

8. The autonomous underwater transport according to claim 3, wherein the controller is configured for transmitting a range and bearing of the one or more detected sensors on the one or more undersea mines to one or more deployed mine countermeasure devices.

9. The autonomous underwater transport according to claim 1, wherein the mine countermeasure device is tilted prior to being ejected such that the mine countermeasure device is ejected at an obtuse angle with respect to a direction of travel of the underwater transport.

* * * * *